United States Patent
Shioya

(10) Patent No.: US 9,286,666 B2
(45) Date of Patent: Mar. 15, 2016

(54) IMAGE PROCESSING APPARATUS AND METHOD, AND PROGRAM TO GENERATE HIGH-QUALITY IMAGE USING NORMALIZED IMAGE

(71) Applicant: SONY CORPORATION, Tokyo (JP)

(72) Inventor: Hiroyuki Shioya, Kanagawa (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 14/064,540

(22) Filed: Oct. 28, 2013

(65) Prior Publication Data

US 2014/0126835 A1    May 8, 2014

(30) Foreign Application Priority Data

Nov. 8, 2012  (JP) .................................. 2012-246537

(51) Int. Cl.
| | |
|---|---|
| G06K 9/36 | (2006.01) |
| G06T 5/50 | (2006.01) |
| G06T 5/00 | (2006.01) |

(52) U.S. Cl.
CPC . *G06T 5/50* (2013.01); *G06T 5/008* (2013.01); *G06T 2207/10144* (2013.01); *G06T 2207/20224* (2013.01)

(58) Field of Classification Search
None
See application file for complete search history.

(56) References Cited

U.S. PATENT DOCUMENTS

| 7,428,378 B1 * | 9/2008 | Warpakowski Furlan .... 396/157 |
| 2008/0219585 A1 * | 9/2008 | Kasai et al. .................... 382/274 |
| 2009/0207258 A1 * | 8/2009 | Jang et al. .................. 348/208.1 |

FOREIGN PATENT DOCUMENTS

| JP | 2005-117395 A | 4/2005 |
| JP | 2007-281937 A | 10/2007 |
| JP | 2012-080457 A | 4/2012 |

* cited by examiner

*Primary Examiner* — Eueng-Nan Yeh
(74) *Attorney, Agent, or Firm* — Sony Corporation

(57) ABSTRACT

There is provided an image processing apparatus that includes an ambient-light image obtaining section, a cumulative image generation section, and a high-quality image generation section. The ambient-light image obtaining section obtains an ambient-light image in a first time range, the ambient-light image being an image of an object captured with a predetermined exposure time. The cumulative image generation section generates a cumulative image in a second time range, the cumulative image being obtained by cumulative addition of each pixel value in a plurality of images, the plurality of images being of the object sequentially captured with the predetermined exposure time. The high-quality image generation section generates a high-quality image, the high-quality image being obtained by subtracting a pixel value in the ambient-light image from a corresponding pixel value in a normalized image, the normalized image being the cumulative image normalized based on a total sum of the exposure time.

16 Claims, 18 Drawing Sheets

IMAGE PROCESSING APPARATUS AND METHOD, AND PROGRAM TO GENERATE HIGH-QUALITY IMAGE USING NORMALIZED IMAGE

CROSS REFERENCE TO RELATED APPLICATION(S)

This application claims the benefit of Japanese Priority Patent Application JP 2012-246537 filed Nov. 8, 2012, the entire contents of which are incorporated herein by reference.

BACKGROUND

The present technology relates to an image processing apparatus and method, and a program and, more specifically, to an image processing apparatus and method, and a program with which an object image is captured easily with less noise, balanced shading, and enhanced appearance without the use of a plurality of lighting devices.

Imaging studios with technical expertise use a multi lighting system for imaging of an object. With the multi lighting system, the object is imaged with desirable shadow created by light coming from various directions using a plurality of lighting devices. The use of the multi lighting system enhances the appearance of the object, and leads to an image well worth viewing.

The image of an object captured using the multi lighting system looks better than another of the same object captured by interior lighting or using a strobe light, for example. This is because the image is with unique shadow created by the multi lighting system, and is with the noise reduction effect produced by the object being illuminated with sufficient level of brightness, for example.

Recently, the auction over the Internet or the like is getting very popular. With the auction, buying and selling of goods is conducted based on images of the goods captured by users, and the goods are not available for other users to check themselves. Therefore, how good the images of the goods for sale look affects the winning price.

The demand for full-scale imaging using the multi lighting system is thus growing among the users not specifically interested in imaging.

The concern here is that imaging using the multi lighting system may not be fully advantageous for not-experienced users because expert skill is expected to adjust the shading balance.

In consideration thereof, a technology has been proposed to ease adjustment of the shading balance. For example, refer to Japanese Patent Application Laid-Open No. 2007-281937 (hereinafter, referred to as Patent Document 1).

In Patent Document 1, the shading balance of an object is adjusted after imaging thereof using a simulation image to check. That is, the object is imaged by turning on a plurality of lighting devices one by one, and the resulting digital images are combined by weighted addition so that the simulation image is obtained. This somewhat reduces the complicated process of adjusting the shading balance at the time of imaging.

Also in Patent Document 1, even if the object is being illuminated both by the ambient light and the illumination light, the problem of the resulting combined image becoming brighter than the expected image is prevented by subtraction of the ambient-light image.

Also proposed is a technology of displaying captured images at any time during long-exposure imaging such as bulb imaging. For example, refer to Japanese Patent Application Laid-Open No. 2005-117395 (hereinafter, referred to as Patent Document 2).

With the technology of Patent Document 2, however, overlay of a plurality of images captured by long-exposure imaging causes superposition of noise floor. Therefore, a larger number of images per unit time during long-exposure imaging increase the noise floor in the resulting combined image.

In consideration thereof, proposed is a technology of reducing the noise floor in the combined image by reducing the actual number of images to be captured without reducing the display frame rate by less-frequent reading of lines. For example, refer to Japanese Patent Application Laid-Open No. 2012-80457 (hereinafter, referred to as Patent Document 3).

SUMMARY

The concern here is that, with the apparatus of Patent Document 1, the user may be indeed allowed to adjust the luminance of light from the lighting devices by simulation after finishing imaging, but not allowed to adjust the position and direction of the lighting devices by simulation, for example. This means that the previous technology has many restrictions on shading adjustment of the object.

Moreover, in order to use the technology of Patent Document 1, the use of a plurality of computer-controllable lighting devices is expected so that the time and cost for the placement thereof is a burden, for example.

In the first place, the multi lighting system itself is a large-scale project for amateur users with no expertise. Further, with the multi lighting system, a larger number of lighting devices indeed leads to a higher flexibility but results in more complicated shading control.

Still further, in order to reduce the effect caused by superposition of noise on the image such as light shot noise, the use of a lighting device that emits relatively strong light is expected. The use of the multi lighting system for imaging is not thus easy for the amateur users.

Also in Patent Document 1, adequate measures are not taken against the shot noise in ambient light components. There thus is a possibility of causing strong noise in any portion especially dark in the image, which is free from the ambient light components after the subtraction process performed thereon.

This is because a pixel value a+b being the sum of pixel values a and b includes variance of shot noise of a+b, and similarly to this pixel value addition, a pixel value a−b being the difference between the pixel values a and b also includes the variance of shot noise of a+b. That is, the noise is added together even at the time of pixel value subtraction, e.g., even with a pixel value of a−a=0 (i.e., black), noise included therein is a+a=2a, and this thus causes strong noise in any dark portion.

With the technologies of Patent Documents 2 and 3, no consideration is given to dark current noise.

It is thus desirable to easily capture an object image with less noise, balanced shading, and enhanced appearance without the use of a plurality of lighting devices.

According to an embodiment of the present technology, there is provided an image processing apparatus that includes an ambient-light image obtaining section, a cumulative image generation section, and a high-quality image generation section. The ambient-light image obtaining section is configured to obtain an ambient-light image in a first time range, the ambient-light image being an image of an object captured with a predetermined exposure time. The cumulative image generation section is configured to generate a cumulative image in a second time range after the first time range, the cumulative image being obtained by cumulative addition of each pixel value in a plurality of images, the plurality of images being of the object captured one by one with the predetermined exposure time. The high-quality image generation section is configured to generate a high-quality image, the high-quality image being obtained by subtracting a pixel value in the ambient-light image from a corresponding pixel value in a normalized image, the normalized image being the cumulative image normalized based on a total sum of the exposure time.

The image processing apparatus may further include a light turning-off detection section that is configured to determine whether or not a lighting device is turned off, the lighting device being a light source different from a light source from which light is initially emitted for illumination of the object. When the lighting device is determined as being turned off, the ambient-light image may be captured.

The lighting device may be turned on during imaging in a time range after the ambient-light image is captured.

The lighting device may be held by a user, and be moved in an arc.

The cumulative image generation section may be configured to perform the cumulative addition of the images of the object captured in the second time range, the cumulative addition being performed by classifying the images by direction based on information specifying toward which directions the lighting device emits light. The high-quality image generation section may be configured to generate another high-quality image by combining the high-quality images at a predetermined ratio, the high-quality images each being obtained by subtracting the pixel value in the ambient-light image from the corresponding pixel value in the normalized image, the normalized image being each of the cumulative images classified by direction and normalized based on the total sum of the exposure time.

The image processing apparatus may further include a display section that is configured to produce an image display. The display section may be configured to display a GUI that is for specifying the ratio of combining the plurality of high-quality images.

The cumulative image generation section may be configured to divide the second time range into a plurality of short time ranges, and may be configured to perform the cumulative addition of the images of the object captured in the second time range by classifying the images by the short time range. The high-quality image generation section may be configured to generate another high-quality image by combining the high-quality images at a predetermined ratio, the high-quality images each being obtained by subtracting the pixel value in the ambient-light image from the corresponding pixel value in the normalized image, the normalized image being each of the cumulative images classified by the short time range and normalized based on the total sum of the exposure time.

The image processing apparatus may further include a display section that is configured to produce an image display. The display section may be configured to display a GUI that is for specifying the ratio of combining the plurality of high-quality images.

The image processing apparatus may further include a display section that is configured to produce an image display. In the second time range, the high-quality image may be sequentially displayed on the display section.

A gain may show a gradual increase before a lapse of a predetermined time in the second time range, the gain being multiplied to a luminance value of a pixel in the high-quality image displayed on the display section.

A gain may show a gradual increase before a maximum luminance value of a pixel in the cumulative image reaches a predetermined value, the gain being multiplied to a luminance value of a pixel in the high-quality image displayed on the display section.

In the cumulative image, a weight coefficient may be multiplied to each of the pixel values in the plurality of images to prevent a per-image proportional contribution of the images from being lower than a predetermined value, the images being captured in the second time range.

Occurrence of specular reflection on a surface of the object may be detected based on a change of a pixel value in the cumulative image, and the weight coefficient may be changed in value to reduce the proportional contribution of the image observed with the specular reflection.

By a predetermined computing process performed on the pixel values, a lighting color may be changed to illuminate the object in the images captured in the second time range.

According to an embodiment of the present technology, there is provided an image processing method that includes obtaining, by an ambient-light image obtaining section, an ambient-light image in a first time range, the ambient-light image being an image of an object captured with a predetermined exposure time, generating, by a cumulative image generation section, a cumulative image in a second time range after the first time range, the cumulative image being obtained by cumulative addition of each pixel value in a plurality of images, the plurality of images being of the object captured one by one with the predetermined exposure time, and generating, by a high-quality image generation section, a high-quality image, the high-quality image being obtained by subtracting a pixel value in the ambient-light image from a corresponding pixel value in a normalized image, the normalized image being the cumulative image normalized based on a total sum of the exposure time.

According to an embodiment of the present technology, there is provided a program causing a computer to function as an image processing apparatus that includes an ambient-light image obtaining section, a cumulative image generation section, and a high-quality image generation section. The ambient-light image obtaining section is configured to obtain an ambient-light image in a first time range, the ambient-light image being an image of an object captured with a predetermined exposure time. The cumulative image generation section is configured to generate a cumulative image in a second time range after the first time range, the cumulative image being obtained by cumulative addition of each pixel value in a plurality of images, the plurality of images being of the object captured one by one with the predetermined exposure time. The high-quality image generation section is configured to generate a high-quality image, the high-quality image being obtained by subtracting a pixel value in the ambient-light image from a corresponding pixel value in a normalized image, the normalized image being the cumulative image normalized based on a total sum of the exposure time.

According to a first embodiment of the present technology, in a first time range, obtained is an ambient-light image being an image of an object captured with a predetermined exposure time. In a second time range after the first time range, generated is a cumulative image obtained by cumulative addition of each pixel value in a plurality of images, the plurality of images being of the object captured one by one with the predetermined exposure time. A high-quality image is generated by subtracting a pixel value in the ambient-light image from a corresponding pixel value in a normalized image, the normalized image being the cumulative image normalized based on a total sum of the exposure time.

According to the embodiments of the present technology, an object image is captured easily with less noise, balanced shading, and enhanced appearance without the use of a plurality of lighting devices.

These and other objects, features and advantages of the present disclosure will become more apparent in light of the following detailed description of best mode embodiments thereof, as illustrated in the accompanying drawings.

DETAILED DESCRIPTION OF EMBODIMENT

Hereinafter, an embodiment of the present technology will be described with reference to the drawings.

Figure 1:
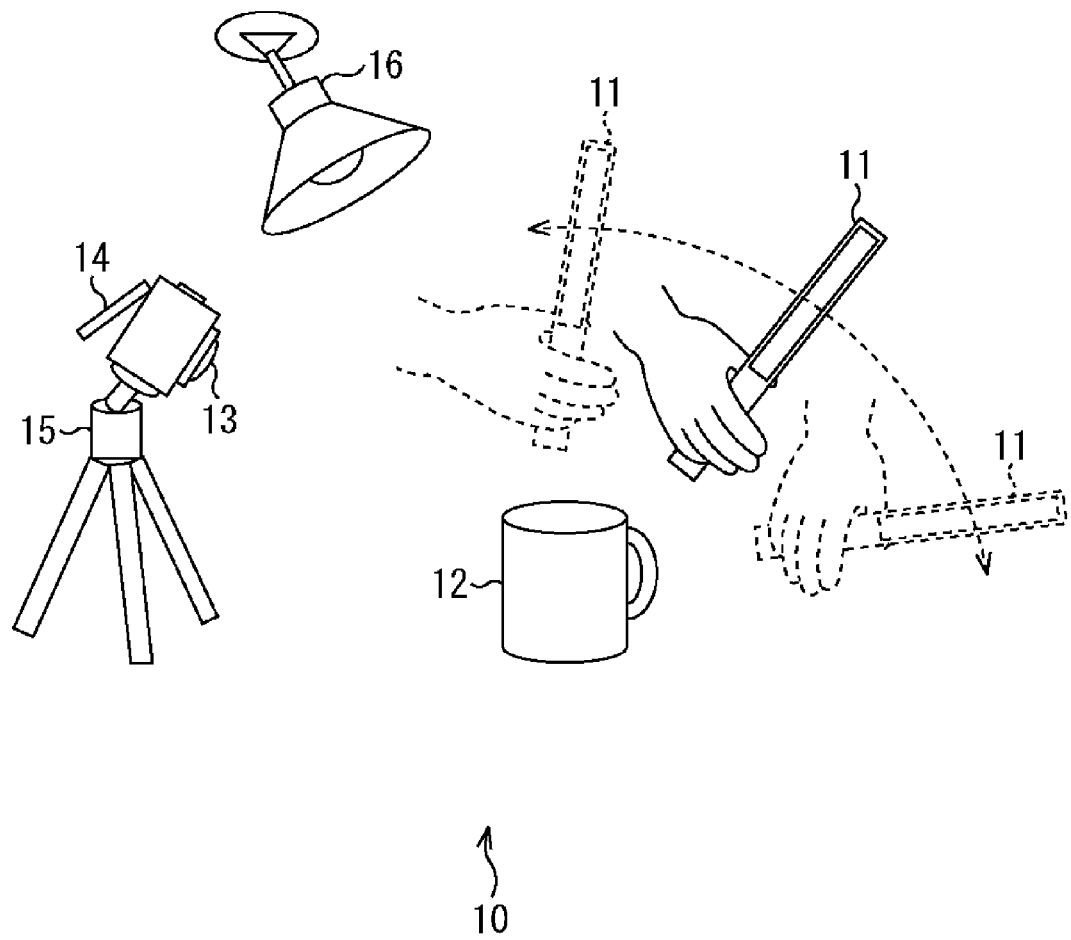
FIG. 1 is a diagram showing an exemplary configuration of an imaging system according to an embodiment of the present technology.

FIG. 1 is a diagram showing an exemplary configuration of an imaging system according to the embodiment of the present technology. In FIG. 1, an imaging system 10 is configured to include a movable lighting device 11, an object 12, a camera 13, a tripod 15, and an ambient light source 16. The camera 13 is provided with a display 14.

The imaging system 10 of FIG. 1 is so configured as to easily capture a good image with better appearance like an image captured using the multi lighting system, even by an amateur user.

The movable lighting device 11 is easily moved by a user to any desired position. In this example, the rod-shaped movable lighting device 11 is held by the user, and is moved in an arc as indicated by a dotted arrow in the drawing. In such a manner, the user may illuminate the object 12 from his/her desired position only by holding the movable lighting device 11 and moving it in an arc. Note that although the movable lighting device 11 in the rod shape is easy to handle, the rod shape is not restrictive and any other shape is possible.

The object 12 is a target for imaging by the imaging system 10.

The camera 13 is a digital camera that is capable of imaging the object 12, and successively obtaining a plurality of images. The camera 13 includes therein a camera module, and images the object 12 using the camera module. This camera module is a device that obtains images with a preset exposure time, and after a lapse of the exposure time, outputs image data of the object 12 successively to the outside, for example. The detailed configuration of the camera 13 will be described later.

Note that, in this example, although the camera 13 is fixed by the tripod 15, the camera 13 may image the object 12 not using the tripod 15.

The display 14 is a display device that presents the image captured by the camera 13 to the user after execution of a process on the image that will be described later. The display 14 is attached to the rear surface or the like of the camera 13, and produces a real-time display of images to show the time, for example.

Although the details will be described later, the user may end imaging at the point in time when the user thinks the shading is desirable while viewing the images displayed on the display 14, for example. Moreover, the display 14 is configured by superposition of a touch device, for example. The display 14 displays thereon images such as GUI (Graphical User Interface), and accepts an operation input made by the user based on the images.

The ambient light source 16 is presumably a lighting device placed in a room where the object 12 is. The ambient light source 16 is assumed as being a general light source such as fluorescent lamp, or an arbitrary light source that constantly emits light, for example. In the drawing, the ambient light source 16 is shown as a piece of lighting device, but may be configured by a plurality of lighting devices. If any light inevitably coming from outside enters the room, this light is considered also as being emitted from the ambient light source 16.

That is, the ambient light source 16 collectively means light sources other than the movable lighting device 11 that emit light toward the object 12.

Figure 2A:
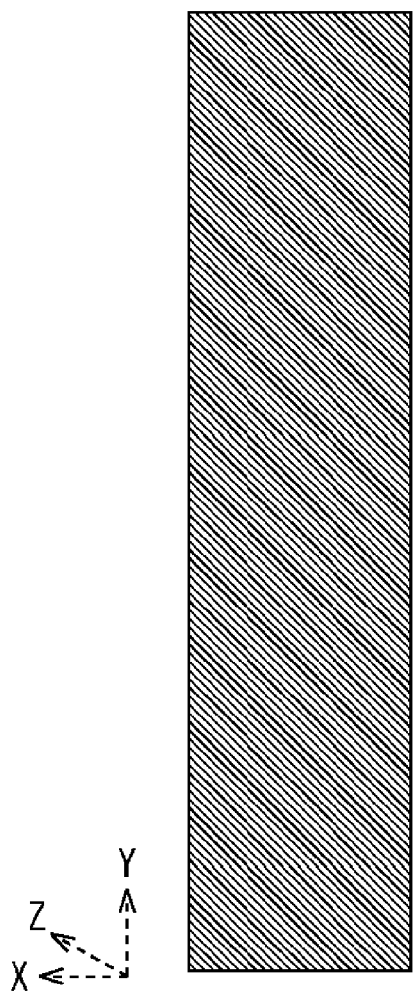
FIGS. 2A and 2B are each a diagram illustrating the outer appearance of a movable lighting device of FIG. 1.
Figure 2B:
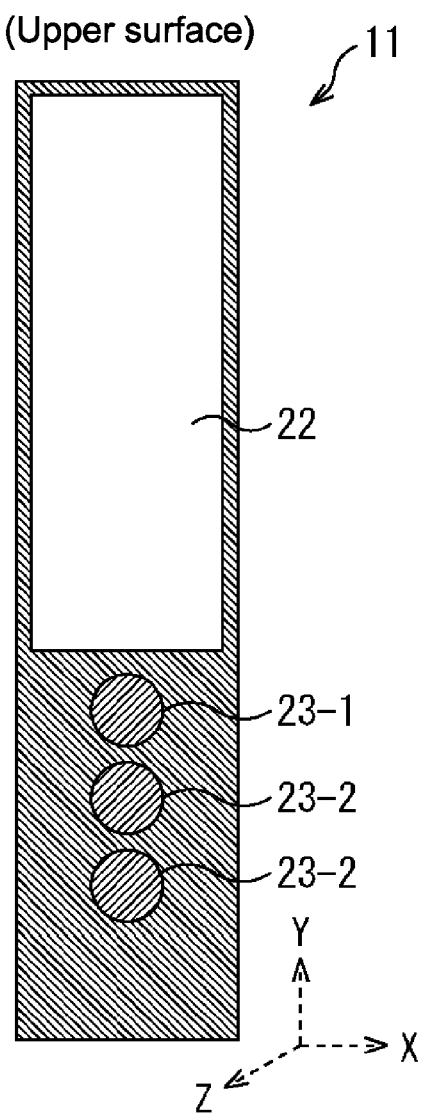

FIGS. 2A and 2B are each a diagram illustrating the outer appearance of the movable lighting device 11 of FIG. 1. FIG. 2A shows the rear plane of the movable lighting device 11, and FIG. 2B shows the light-emitting plane (surface) of the movable lighting device 11.

The movable lighting device 11 is provided on the surface with a light-emitting window 22, which is a planar area illuminated by the light coming from an internal light source.

The movable lighting device 11 is provided on the surface with buttons 23-1 to 23-3, which are operated by the user. In this example, provided are the three buttons 23-1 to 23-3, but the number of the buttons is not restrictive to three. When any of the buttons is depressed, a signal corresponding to the operation assigned to the depressed button is output.

Note that when there is no specific reason to identify these buttons 23-1 to 23-3, these buttons are simply referred to as buttons 23.

The movable lighting device 11 except the light-emitting window 22 and the buttons 23 is covered by an outer shell, which is the shaded area in the drawing. This outer shell is configured by a low-reflectivity member. This accordingly protects the object 12 from being illuminated by reflection of any unwanted light when the user moves the movable lighting device 11 in an arc, for example.

As will be described later, the movable lighting device 11 is provided with an acceleration sensor, for example, to detect an acceleration vector in six directions that are positive and negative directions of X-axis, Y-axis, and Z-axis, respectively.

Figure 3:
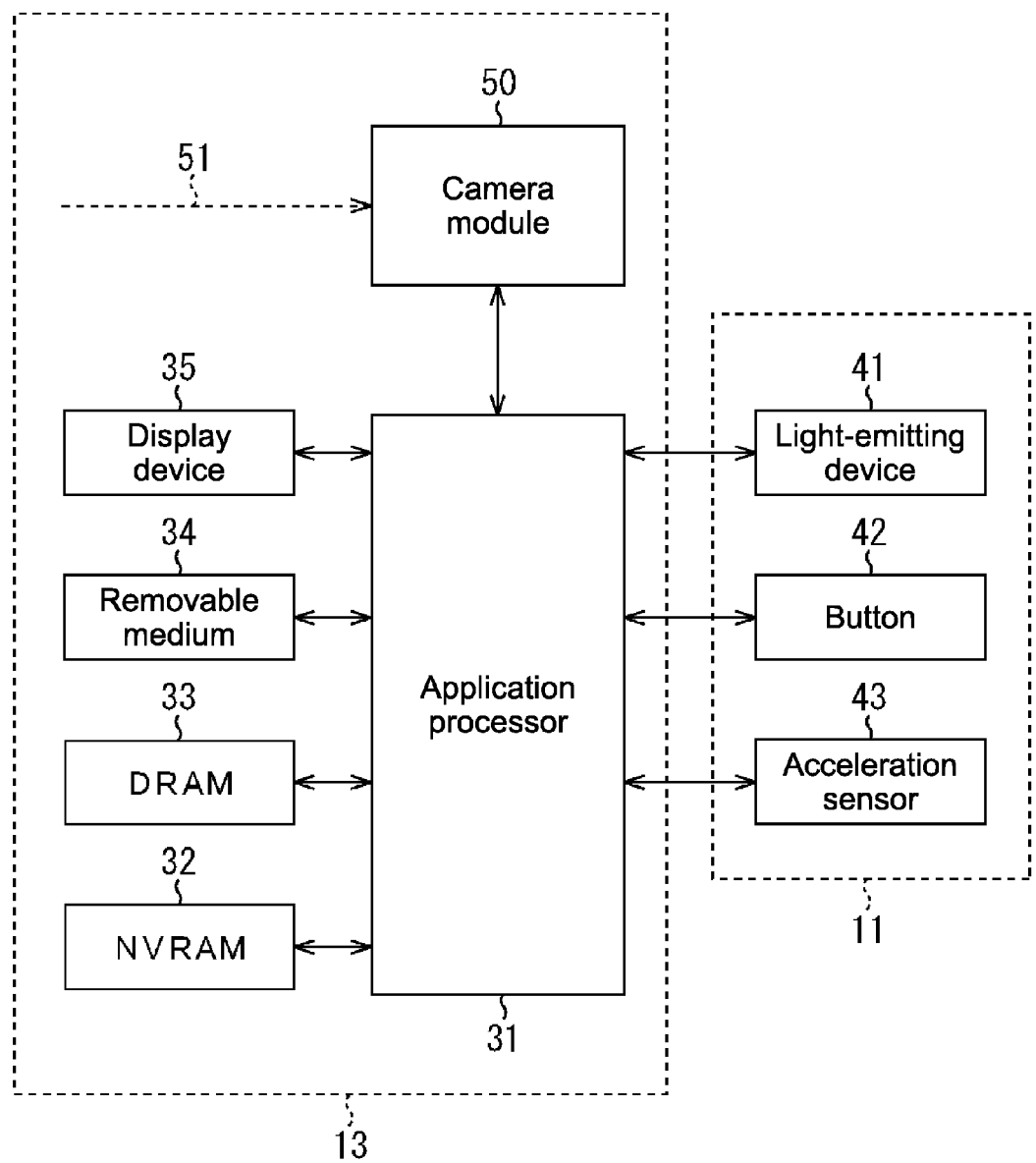
FIG. 3 is a block diagram showing an exemplary internal configuration of a camera of FIG. 1, and that of the movable lighting device thereof.

FIG. 3 is a block diagram showing an exemplary internal configuration of the camera 13 of FIG. 1, and that of the movable lighting device 11 thereof.

In the example of FIG. 3, the camera 13 is configured to include an application processor 31, an NVRAM (NonVolatile Random Access Memory) 32, a DRAM (Dynamic Random Access Memory) 33, a removable medium 34, a display device 35, and a camera module 50. The movable lighting device 11 includes a light-emitting device 41, a button 42, and an acceleration sensor 43.

The application processor 31 of FIG. 3 is a core device in a mobile device packed with a CPU (Central Processing Unit), a GPU (Graphics Processing Unit), a peripheral interface, and the like. The application processor 31 runs software including a program for controlling imaging by the camera 13, image processing, and the like.

The application processor 31 is connected with various types of peripheral devices for loading software and data stored in the NVRAM 32 to the DRAM 33, for example.

The camera module 50 is a device that obtains images of the object 12 by light exposure for a preset time, and after the light exposure, successively outputs data of the images to the outside.

As to the image data obtained by capturing an optical image 51 of the object 12, the camera module 50 is so configured as to transmit the image data to the application processor 31.

The display device 35 is a functional block that controls image display on the display 14 of FIG. 1. As described above, the display 14 is equipped with the touch device (not shown), and via this display device, an operation signal is provided to the application processor 31. This operation signal is output in response to the user's touch by finger on the surface of the display 14.

As to the image data provided after the process by the application processor 31, the removable medium 34 stores the image data in the form of a file by a recording process, for example. Alternatively, the removable medium 34 may store software including a program to be installed to the camera 13, for example.

The light-emitting device 41 is a light emitter (light source) configured by an LED (Light Emitting Diode), for example. As indicated by an arrow in the drawing, the application processor 31 is provided with information as appropriate about whether or not the light-emitting device 41 is emitting light.

The button 42 is a functional block of the buttons 23 of FIG. 2B, and may output a predetermined signal in response to depression by the user. As indicated by an arrow in the drawing, the signal output from the button 42 is provided to the application processor 31 as appropriate.

The acceleration sensor 43 detects the acceleration, e.g., detects an acceleration vector in six directions that are positive and negative directions of X-axis, Y-axis, and Z-axis, respectively. As indicated by an arrow in the drawing, the acceleration detected by the acceleration sensor 43 is provided to the application processor 31 as appropriate.

In this example, the acceleration sensor 43 is provided, but as an alternative to the acceleration sensor 43, an angular velocity sensor or a geomagnetic sensor may be provided, for example.

In FIG. 3, arrows between the camera 13 and the movable lighting device 11 may be implemented by wireless or wired communication, for example. Alternatively, information about the movable lighting device 11 may be provided to the application processor 31 in response to a user input thereof made by operating the camera 13, the touch device of the display 14, and the like.

The movable lighting device 11 may be provided with a micro controller to have the light-emitting device 41, the button 42, and the acceleration sensor 43 operated as peripheral devices.

Figure 4:
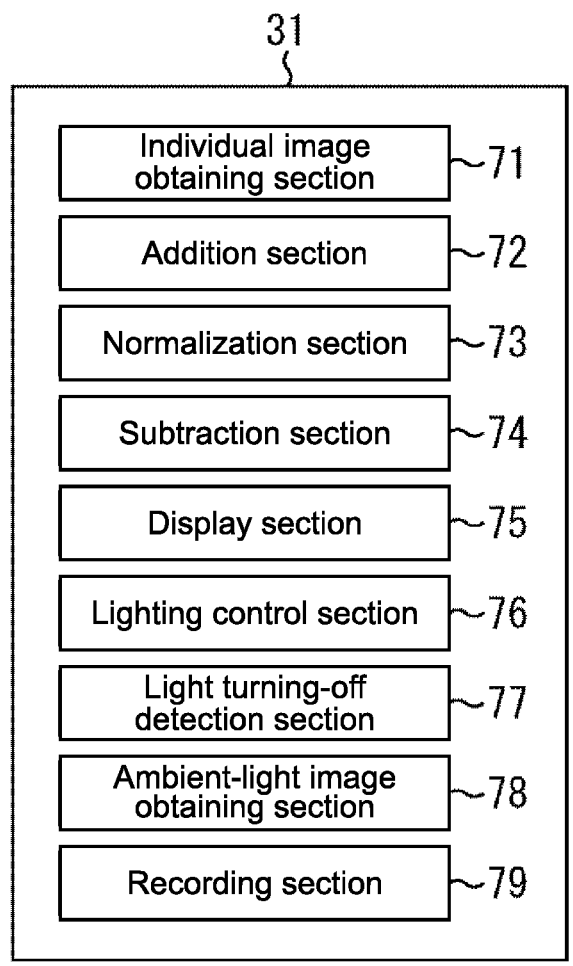
FIG. 4 is a block diagram showing an exemplary functional configuration of software such as program to be run by an application processor of FIG. 3.

FIG. 4 is a block diagram showing an exemplary functional configuration of software including a program to be run by the application processor 31 of FIG. 3.

In FIG. 4, an individual image obtaining section 71 controls the camera module 50 to have it captured a plurality of images of the object 12, thereby obtaining image data of the images. The individual image obtaining section 71 of FIG. 4 obtains a frame image in each of the images of the object 12 captured as moving pictures.

Herein, the imaging cycle of the camera module 50 is desirably set to 10 frames per second or more to allow the user's interactive adjustment of shading, for example. Moreover, the exposure time of the camera module 50 is desirably set not to cause pixel value saturation even if the object 12 is illuminated by the movable lighting device 11.

The images obtained by the individual image obtaining section 71 include images captured with the movable lighting device 11 turned on, and the number of images obtained by the individual image obtaining section 71 is determined based on the user operation, for example. Note here that the individual image obtaining section 71 may be used also when an ambient-light image obtaining section 78 obtains ambient-light images.

In each of the images obtained by the individual image obtaining section 71, an addition section 72 performs a pixel value addition for every corresponding pixel. Herein, the addition section 72 may be used also when the ambient-light image obtaining section 78 obtains the ambient-light images.

As to the pixel values obtained for the images by the addition section 72, a normalization section 73 normalizes the images by dividing each of the pixel values by the number of images subjected to the pixel value addition (to be precise, the total sum of the exposure time). Herein, the normalization section 73 may be used also when the ambient-light image obtaining section 78 obtains the ambient-light images.

From the pixel values in each of the images after the process of normalization by the normalization section 73, a subtraction section 74 subtracts pixel values of any corresponding pixels in an image obtained by the ambient-light image obtaining section 78 that will be described later. With this subtraction, the images after the normalization may be free from reflection, shading, and the like resulted from the ambient light.

A display section 75 provides the display device 35 with display data of the images after the process by the subtraction section 74, thereby having the display 14 displayed the images after the process by the subtraction section 74.

A lighting control section 76 controls the movable lighting device 11 to be turned on or off. The lighting control section 76 controls the movable lighting device 11 to be turned on only when the movable lighting device 11 is determined as moving based on the acceleration detected by the acceleration sensor 43, for example.

This lighting control section 76 is not necessarily provided, or may be provided inside of the movable lighting device 11. Moreover, the lighting control section 76 may produce a sound output or a screen display to instruct the user to turn off the movable lighting device 11, or to permit the user to turn on the movable lighting device 11.

A light turning-off detection section 77 detects turning-off of the movable lighting device 11. This detection about turning-off of the movable lighting device 11 may be performed by communication, or by a user input made by operating the touch device for his/her confirmation about turning-off of the movable lighting device 11.

The ambient-light image obtaining section 78 controls the camera module 50 to have it captured images of the object 12 with the movable lighting device 11 being turned off. The ambient-light image obtaining section 78 then obtains image data of the images.

The images obtained by the ambient-light image obtaining section 78 are those captured with the movable lighting device 11 being turned off, i.e., only those captured in the state that the movable lighting device 11 is detected as being turned off by the light turning-off detection section 77. The number of images to be obtained by the ambient-light image obtaining section 78 may be a piece, or a plurality of images may be obtained using the individual image obtaining section 71, the addition section 72, and the normalization section 73, and eventually a piece of ambient-light image may be obtained.

A recording section 79 controls recording of the image data onto the removable medium 34.

Figure 5:
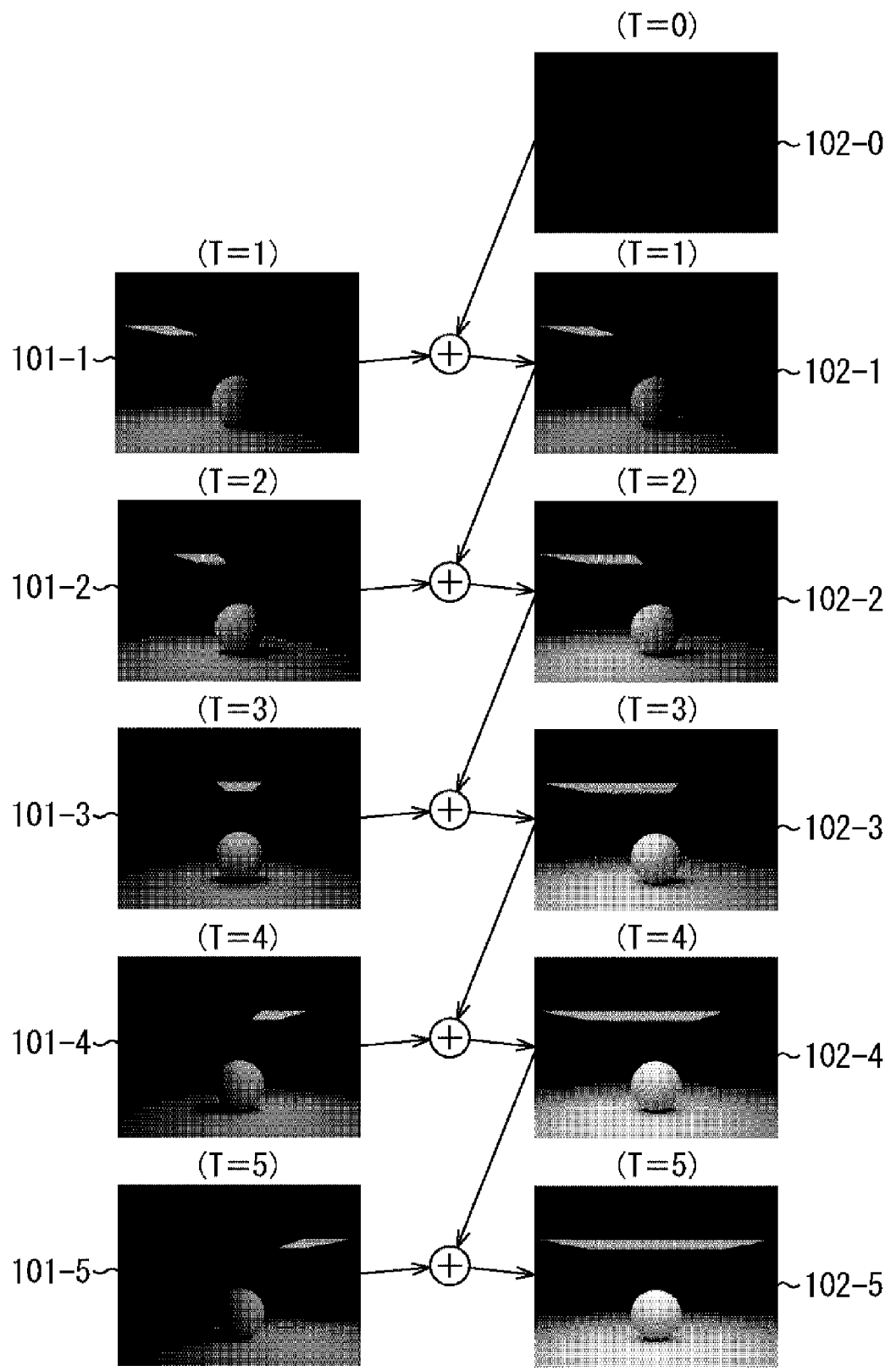
FIG. 5 is a diagram illustrating in detail a process by software such as program to be run by the application processor.
Figure 6:
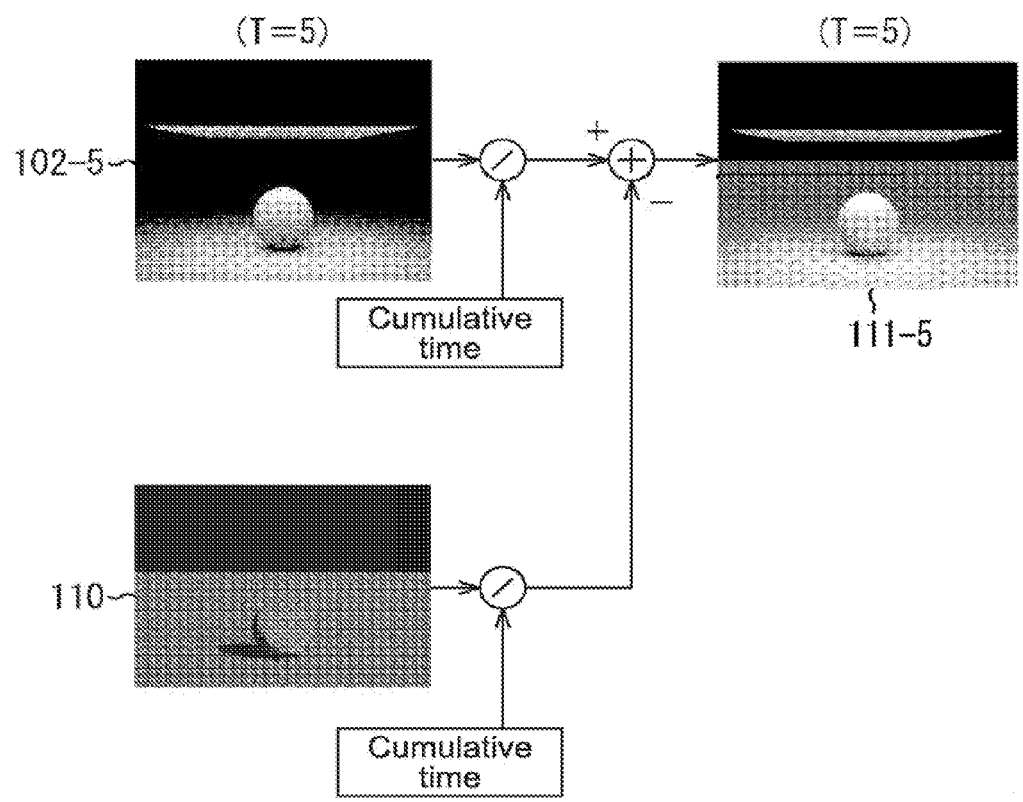
FIG. 6 is a diagram illustrating in detail a process by software such as program to be run by the application processor.

By referring to FIGS. 5 and 6, described in detail is a process by software including a program to be run by the application processor 31.

As described above, the individual image obtaining section 71 controls the camera module 50 to have it captured a plurality of images of the object 12, thereby obtaining image data of the images. In FIG. 5, the left side shows individual images 101-1 to 101-5, which are images of the image data obtained by the individual image obtaining section 71.

In this example, an object for imaging is a spherical substance, and above the spherical substance, the rod-shaped light-emitting window 22 of the movable lighting device 11 is displayed. The individual images 101-1 to 101-5 are those captured respectively at times T=1 to T=5. During the imaging, the movable lighting device 11 is moved from left to right in the drawing but not the object.

In this example, the individual images 101-1 to 101-5 are all captured when the movable lighting device 11 is turned on. Alternatively, the user may turn on the movable lighting device 11 as appropriate. For example, the movable lighting device 11 may be turned on for imaging at times T=1, T=3, and T=4, and the movable lighting device 11 may be turned off for imaging at times T=2, and T=4.

As described above, the addition section 72 performs a pixel value addition for every corresponding pixel in each of the images obtained by the individual image obtaining section 71. The resulting images after the pixel value addition are stored as cumulative images in a memory being a predetermined storage area in the DRAM 33, for example. In FIG. 5, the right side shows cumulative images 102-0 to 102-5.

The cumulative image 102-0 corresponds to an initial value of data in the memory, and in this example, is an image being entirely black. The addition section 72 adds together the cumulative image 102-0 and the individual image 101-1, thereby generating the cumulative image 102-1. The addition section 72 also adds together the cumulative image 102-1 and the individual image 101-2, thereby generating the cumulative image 102-2.

With such an addition repeatedly performed, the cumulative image 102-5 is generated. In this cumulative image 102-5, the spherical substance being the object is brightly displayed as a result of the repeated addition of pixel values, and the originally rod-shaped light-emitting window 22 of the movable lighting device 11 is displayed like a wide plane.

In such a manner, by cumulatively adding the individual images captured at various different times, even when the lighting device in use is only the movable lighting device 11, the virtual lighting effect may be obtained as if a plurality of lighting devices were spatially disposed. Therefore, according to the embodiment of the present technology, even when a user is amateur with no expertise, images to be captured thereby have enhanced appearance with ease similarly to those captured by using the multi lighting system.

In this example, for brevity, exemplified is the case of cumulatively adding the individual images captured at times T=1 to T=5. However, actually, several tens to hundreds of individual images are captured and cumulatively added together. For the user's interactive adjustment of shading, the screen of the display 14 is updated desirably for every ten frames per second or more, and desirably with a frequency similar thereto, the individual images are to be captured.

Also for the user's interactive adjustment of shading, the movable lighting device 11 is expected to be held and moved in an arc by the user for several to a dozen or so seconds to create shading. If this is the case, the number of the individual images is several tens to hundreds in total.

When a large number of individual images are cumulatively added together, noise components such as shot noise superposed on the individual images at all times are significantly reduced so that the resulting images are improved in quality. Further, cumulatively adding together several hundreds of individual images produces the great noise reduction effect, for example. This thus leads to images in which the effect of noise such as light shot noise is significantly reduced without using a lighting device that emits strong light. That is, according to the embodiment of the present technology, the noise reduction effect is secondarily produced.

Still further, by reducing the exposure time at the same time as reducing the imaging cycle, imaging is prevented from failing due to pixel value saturation that often occurs during imaging with multiple exposure, for example.

As described above, as to the pixel values obtained in the images by the addition section 72, the normalization section 73 normalizes the images by dividing each of the pixel values by the number of images subjected to the pixel value addition. By taking the cumulative image 102-5 as an example, this image is the result of cumulatively adding five individual images, and thus is normalized by dividing each pixel value by 5.

Note that, actually, the exposure time is not fixed at all times during imaging of the individual images 101-1 to 101-5. In consideration thereof, each pixel value in the cumulative image 102-5 is divided desirably by the total exposure time spent for imaging of the individual images 101-1 to 101-5. Hereinafter, the total exposure time is referred to as cumulative time.

In the example of FIG. 6, the cumulative image 102-5 is normalized by dividing each pixel value therein by the cumulative time.

As described above, the ambient-light image obtaining section 78 controls the camera module 50 to have it captured images of the object 12 in the state that the movable lighting device 11 is turned off, and obtains image data of the images. The example of FIG. 6 shows an ambient-light image 110 corresponding to image data obtained by the ambient-light image obtaining section 78.

The ambient-light image 110 is the image captured when the movable lighting device 11 is turned off, and the example of FIG. 6 shows the image of a dimly-lit object. The ambient-light image 110 may be an image captured at a specific time, or by cumulatively adding images captured at various different times.

For generating the ambient-light image 110 by cumulatively adding images captured at various different times, similarly to the case described above by referring to FIG. 5, the addition section 72 performs pixel value addition, and the normalization section 73 performs normalization. This accordingly produces the noise reduction effect also in the ambient-light image 110. That is, with normalization performed by cumulatively adding a plurality of images, an arbitrary number of ambient-light images may be cumulatively added together until the shot noise (including noise floor) is reduced to a sufficient level.

When the ambient-light image 110 is an image captured at a specific time, noise reduction is desirably accomplished by a very-effective noise removal technique such as bilateral filtering or NL-MEANS filtering.

In the example of FIG. 6, the ambient-light image 110 is the one generated by cumulatively adding images captured at various different times, and each pixel value in the ambient-light image 110 is divided by the cumulative time.

Moreover, as described above, from the pixel values in each of the images after the process of normalization by the normalization section 73, the subtraction section 74 subtracts pixel values of any corresponding pixels in the image obtained by the ambient-light image obtaining section 78. That is, because the cumulative image includes ambient-light components at all times, by removing the ambient-light components, the resulting image has shading as if it were captured in a darkroom.

In the example of FIG. 6, from the pixel values in the normalized image of the cumulative image 102-5, the pixel values in the normalized image of the ambient-light image 110 are subtracted so that a high-quality image 111-5 is generated. As shown in the drawing, the high-quality image 111-5 does not have the shadow observed in the ambient-light image 110, i.e., on the left side of the spherical substance being the object.

In this manner, the resulting image may have shading the same as that of an object image captured using the multi lighting system in a darkroom with no ambient light, for example.

Also in this manner, the shot noise in the ambient-light components is reduced, thereby being able to cancel out the dark current noise included in the ambient-light noise and that in the light components from the movable lighting device.

The high-quality image 111-5 is then presented to the user by being displayed on the display 14 by the display section 75. Note that the high-quality image is updated every time an individual image is obtained. Therefore, similarly to a case of displaying images of moving pictures, while the user images an object, the updated image is continuously displayed on the display. The user moves the movable lighting device 11 while looking at the high-quality image on the display 14, and when the user thinks that the high-quality image has his/her desired shading, the user issues a command to end the imaging.

As described above, the recording section 79 controls recording of the image data of the high-quality image onto the removable medium 34. At the time of recording of the image data of the high-quality image, the data is recorded in the recording format as shown in FIG. 7.

Figure 7:
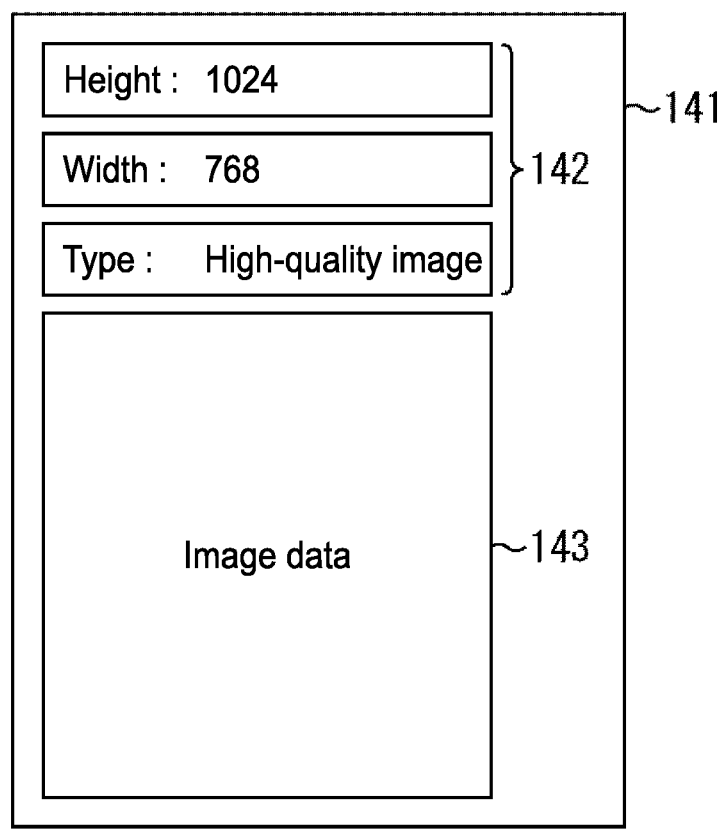
FIG. 7 is a diagram illustrating an exemplary recording format for image data of a high-quality image.

In the example of FIG. 7, a recording unit of a file 141 includes image data 143, and meta data 142. In this example, the meta data 142 is configured by three tags of height, width, and type. The tag of type in the meta data is information for use to determine whether or not the image is a high-quality image according to the embodiment of the present technology.

The use of such tags allows easy separation only of high-quality images, and leads to easy image search and display, for example.

In such a manner, according to the embodiment of the present technology, images are obtained with the similar quality as those captured by full-scale imaging with the use of multi lighting system in a darkroom.

Described next is an exemplary imaging process by the imaging system 10 by referring to the flowchart of FIG. 8.

In step S21, the lighting control section 76 turns off the movable lighting device 11. At this time, the movable light device 11 may be turned off by wireless or wired signal transmission, or a message may be displayed on the display 14 to instruct turning-off of the movable lighting device 11, for example.

In step S22, the light turning-off detection section 77 determines whether or not turning-off of the movable lighting device 11 is detected. This detection of turning-off of the movable lighting device 11 may be performed by wireless or wired communication, or the user may make an input by operating the touch device for his/her confirmation about turning-off of the device, for example.

In step S22, when a determination is made that the turning-off of the light is not detected, the procedure returns to step S21. At this time, an error message may be displayed on the display 14, or a warning may be issued by sound to prompt turning-off of the light, for example.

On the other hand, when a determination is made that the turning-off of the device is detected, the procedure goes to step S23.

In step S23, the ambient-light image obtaining section 78 controls the camera module 50 to have it captured an image of the object 12, and obtains image data of the image.

In step S24, the lighting control section 76 permits turning-on of the movable lighting device 11. At this time, the movable lighting device 11 may be turned on by wireless or wired signal transmission, or a message may be displayed on the display 14 to permit turning-on of the movable lighting device 11, for example.

In step S25, a high-quality image generation process is performed, which will be described later by referring to the flowchart of FIG. 9. With this process, a high-quality image is generated.

In step S26, the display section 75 provides the display device 35 with display data of the image, which is obtained by the process of the subtraction section 74. The display section 75 then has the display 14 displayed the image obtained by the process of the subtraction section 74.

In step S27, a determination is made whether or not a command is issued to end the imaging. This command may be issued by depression of a button or the like of the camera 13, or may be issued by depression of any of the buttons 23 of the movable lighting device 11, for example. Alternatively, the command may be issued automatically to end the imaging when the high-quality image generated in step S25 is detected as remaining almost the same.

Still alternatively, the high-quality image generation process may be temporarily stopped when detection is made that the user stops illuminating the object by the movable lighting image 11. This may prevent cumulative addition of images that are captured in the duration between the stopping of object illumination and the depression of the button or the like of the camera 13.

Herein, the detection whether or not the user stops illuminating the object may be made by detecting turning off of the light based on the operation of the buttons 23 of the movable lighting device, or when a pixel value change in the high-quality image becomes smaller than a predetermined value, for example. Still alternatively, image recognition may be used as a basis to detect turning-off of light. When a pixel value difference between the individual image and the ambient-light image falls within a predetermined range, detection may be made that the light is turned off. Still alternatively, sound detection may be used as a basis to detect that the user stops illuminating the object. When the level of the sound becomes higher than a predetermined value, or when predetermined sound is acknowledged, detection may be made that the user stops illuminating the object.

When a preset given trigger is detected, for example, the high-quality image generation process is resumed. This trigger may be issued when turning-on of the light is detected based on the operation of the buttons 23, or when turning-on of the light is detected by image recognition (when a pixel value difference between the captured image and the ambient-light image becomes a predetermined value or larger), for example. Still alternatively, the trigger may be issued when any sound is detected, e.g., when the level of the sound becomes higher than a predetermined value, or when a predetermined sound is recognized.

In step S27, when a determination is made that the command is not yet issued to end the imaging, the procedure returns to step S25, and the processes thereafter are repeated. On the other hand, in step S27, when a determination is made that the command is issued to end the imaging, the procedure goes to step S28.

In step S28, the recording section 79 generates a file in the predetermined recording format including the image data of the high-quality image generated in the process of step S25. At this time, generated is the file described above by referring to FIG. 7, for example.

Then in step S29, the file generated in step S28 is recorded. In this manner, the imaging process is performed.

Figure 8:
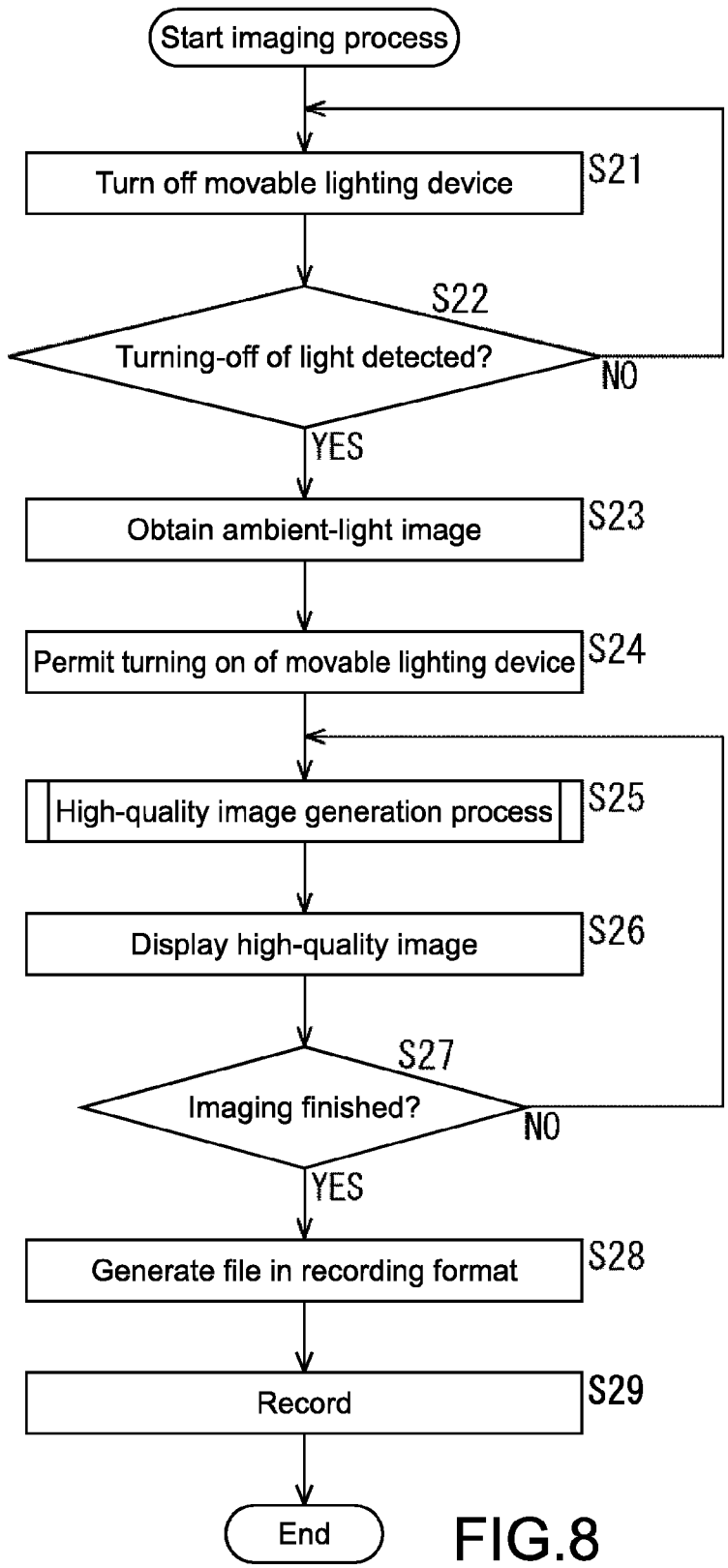
FIG. 8 is a flowchart illustrating an exemplary imaging process.
Figure 9:
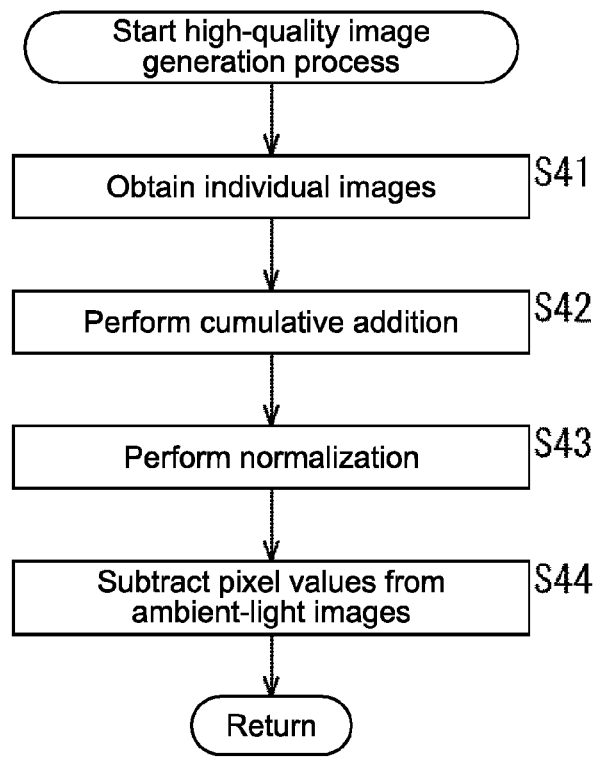
FIG. 9 is a flowchart illustrating an exemplary high-quality image generation process.

Next, by referring to the flowchart of FIG. 9, described is a detailed example of the high-quality image generation process in step S25 of FIG. 8.

In step S41, the individual image obtaining section 71 obtains individual images. At this time, obtained are the individual images 101-1 to 101-5 of FIG. 5 one by one.

In step S42, the addition section 72 cumulatively adds the individual images obtained by the individual image obtaining section 71. At this time, as described above by referring to FIG. 5, each of the individual images is added with the cumulative image one generation before, thereby successively generating the cumulative images 102-1 to 102-5, for example.

In step S43, the normalization section 73 normalizes each of the cumulative images obtained by the process of step S42 by dividing the pixel value by the cumulative time. As shown in FIG. 6, for example, each pixel value in the cumulative images 102-5 is divided by the cumulative time.

When generating an ambient-light image by cumulatively adding images captured at various different times, the processes from step S41 to S43 are also performed.

In step S44, from the pixel values in each of the images obtained by the process of step S43, the subtraction section 74 subtracts the pixel values of corresponding pixels in the corresponding ambient-light image. At this time, as shown in FIG. 6, from the pixel values in the normalized image of the cumulative image 102-5, the pixel values of corresponding pixels in the ambient-light image 110 are subtracted so that the high-quality image 111-5 is generated, for example.

In this manner, the high-quality image is generated. Herein, exemplified is the case that the process of obtaining an ambient-light image in step S23 is performed first, and then processes related to generating a high-quality image in steps S25 to S27 are performed. This is not restrictive, and the processes may be performed in any different order, e.g., processes of steps S25 to S27 may be performed first to generate a high-quality image by estimating an ambient-light image somehow, or by generating a temporary ambient-light image. If this is the case, a high-quality image may be obtained by imaging an ambient-light image after performing the processes in steps to generate a high-quality image, and then replacing the ambient-light image with the temporary ambient-light image. Alternatively, by alternately repeating incremental processes of step S23 (obtaining an ambient-light image) and steps S25 to S27 (generating a high-quality image) for several times in the same state, a high-quality image may be obtained while updating a temporary ambient-light image in a short cycle.

With the so-called bulb imaging being a part of the pervious long-time exposure imaging, first of all, an image exposed to light by an opened mechanical shutter is stored in a memory, and after the light exposure, the mechanical shutter is closed to accumulate the dark current components. Thereafter, from the image stored in the memory, the dark current components are removed. The effect produced by such long-time exposure is similarly produced also by imaging a plurality of images one by one for cumulative addition.

With such bulb imaging, however, the dark-current components are accumulated with the mechanical shutter closed. This does not remove the components of the ambient-light image as does the embodiment of the present technology.

There is also an imaging mode called firework mode, for example, with which a plurality of images are captured one by one for cumulative addition. Even with such an imaging mode, no consideration is given for removal of the ambient-light components.

On the other hand, according to the embodiment of the present technology, an ambient-light image is first captured with an opened mechanical shutter, and after this imaging, the mechanical shutter remains open to capture a plurality of individual images for cumulative addition. From the resulting cumulative images, the components of the ambient-light image are to be removed. Needless to say, imaging according to the embodiment of the present technology is possible even with an inexpensive camera not provided with a mechanical shutter.

Therefore, according to the embodiment of the present technology, any noise resulted from the dark-current components generated by long-time exposure may be prevented from being superposed on images. Moreover, components of ambient-light images causing user's unwanted shading or the like may be removed.

As described above, cumulative addition of a large number of individual images significantly reduces components of noise such as shot noise being superposed on the individual images at all times. However, when the individual images for cumulative addition are small in number, some of the noise components may remain. That is, the high-quality image may not be free from noise before a lapse of sometime after the start of imaging.

Accordingly, before the lapse of a predetermined time after the start of imaging, images may be displayed on the display 14 with reduced luminance or the like not to enhance the noise, for example.

As an example, a vector containing the value of each pixel is used to represent an image, and the luminance of the pixels is adjusted as indicated by Equation 1.

$$\vec{I}' = k \cdot \vec{I} \quad (1)$$

$$\begin{cases} k = \dfrac{t}{t_0} & \text{if } t < t_0 \\ k = 1 & \text{otherwise} \end{cases}$$

In Equation 1, a vector I represents the luminance value of a high-quality image provided as an input image, and a vector I' represents the luminance value of a high-quality image displayed on the display 14. Also in Equation 1, a variable t denotes the cumulative time, and t0 denotes a predetermined constant time. Also in Equation 1, k is a gain for multiplication of the luminance value of the pixels.

Figure 10:
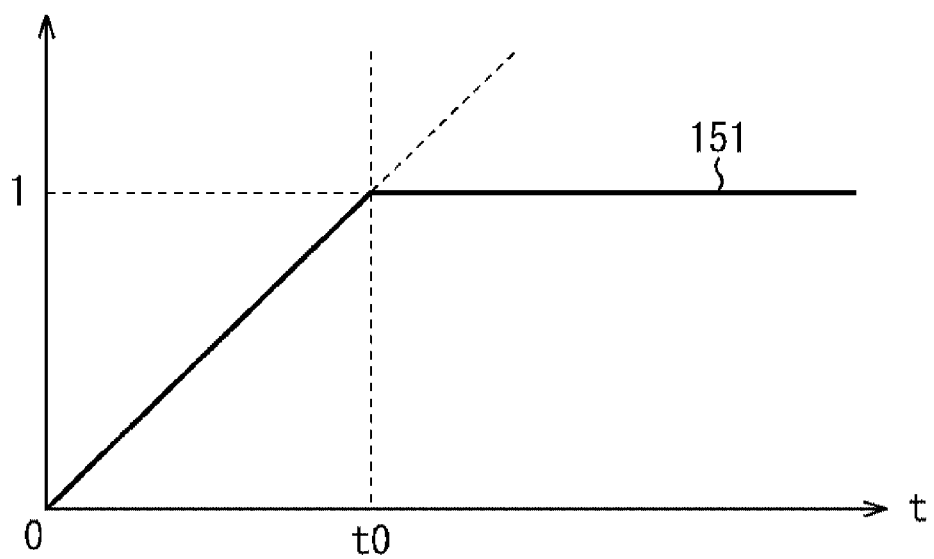
FIG. 10 is a diagram illustrating a change of a gain value in response to a change of cumulative time.

The gain k in Equation 1 varies as shown in FIG. 10, for example. In FIG. 10, the horizontal axis indicates the cumulative time t, and the vertical axis indicates the value of the gain k. The value change of the gain k responding to the change of the cumulative time is indicated by a line 151.

As shown in FIG. 10, the value of the gain k shows a gradual increase until the cumulative time reaches t0, and is fixed to 1 after the cumulative time reaches t0.

With the computing process of Equation 1 using the gain k as shown in FIG. 10, images on the display 14 are displayed with reduced luminance not to enhance the noise before the lapse of a predetermined time after the start of imaging.

Alternatively, by paying attention to the maximum value of the luminance of a high-quality image, the luminance of the pixels may be adjusted as indicated by Equation 2.

$$\vec{I}' = k \cdot \vec{I} \quad (2)$$

$$\begin{cases} k = \dfrac{\max(\vec{Y})}{Y_0} & \text{if } \max(\vec{Y}) < Y_0 \\ k = 1 & \text{otherwise} \end{cases}$$

In Equation 2, the vector I represents the luminance value of a high-quality image provided as an input image, and the vector I' represents the luminance value of a high-quality image displayed on the display 14. Also in Equation 2, a vector Y represents the pixel value in a cumulative image, and max(Y) denotes the maximum pixel value (maximum luminance) in the cumulative image. Also in Equation 2, Y0 denotes predetermined luminance at which the cumulative image becomes brighter, and the shot noise components are determined to be small relative to a luminance signal. Also in Equation 2, k is a gain for multiplication of the luminance value of the pixels.

Figure 11:
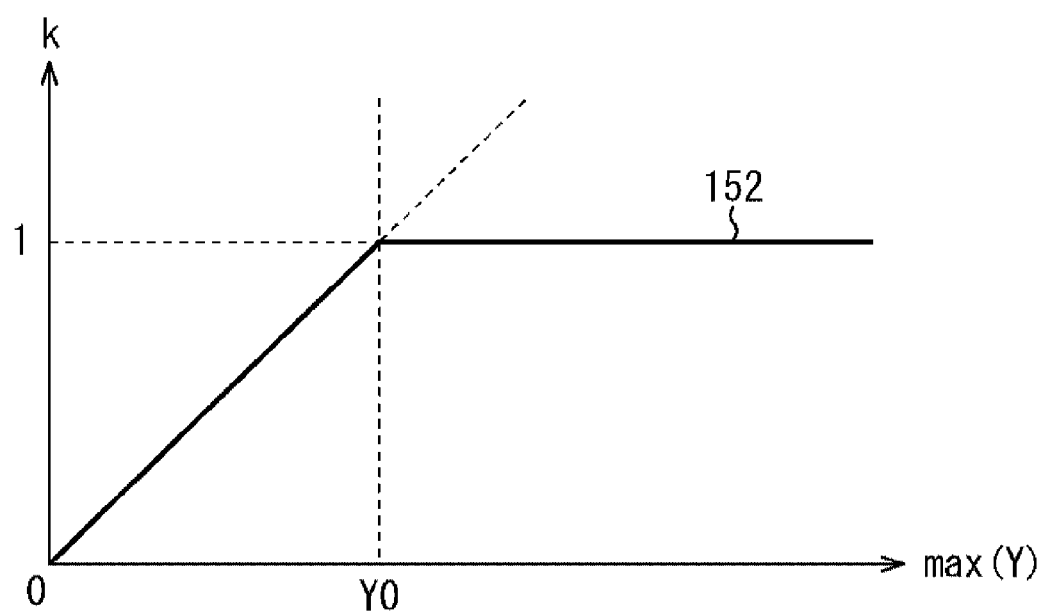
FIG. 11 is a diagram illustrating a change of the gain value in response to a change of maximum luminance.

The gain k in Equation 2 varies as shown in FIG. 11, for example. In FIG. 11, the horizontal axis denotes the maximum luminance max(Y), and the vertical axis denotes the value of the gain k. The value change of the gain k responding to the change of the maximum luminance is indicated by a line 152.

As shown in FIG. 11, the value of the gain k shows a gradual increase until the maximum luminance reaches Y0, and is fixed to 1 after the maximum luminance reaches Y0.

With the computing process of Equation 2 using the gain k as shown in FIG. 11, images on the display 14 are displayed with reduced luminance not to enhance the noise until a predetermined number of images are cumulatively added together.

With the lapse of sufficiently a long time after the start of imaging, if the cumulatively-added individual images are very large in number, the resulting high-quality image looks almost the same. This is because when the cumulatively-added individual images are increased in number, the contribution made by each of the individual images to the high-quality image becomes proportionally less and less (hereinafter, this contribution is referred to as proportional contribution).

The addition process by the addition section 72 is represented by Equation 3.

$$\begin{bmatrix} \vec{Y}_0 \\ t_0 \end{bmatrix} = \begin{bmatrix} \vec{0} \\ 0 \end{bmatrix} \quad (3)$$

$$\begin{bmatrix} \vec{Y}_k \\ t_k \end{bmatrix} = \begin{bmatrix} \vec{Y}_{k-1} + \vec{X}_k \\ t_{k-1} + e_k \end{bmatrix}$$

In Equation 3, a vector Yk represents the pixel value in a cumulative image of k pieces of cumulatively-added individual images, and a vector Xk represents the pixel value in the k-th individual image. Also in Equation 3, tk denotes the exposure time in total (cumulative time) when the k-th individual image is captured, and ek denotes the exposure time during imaging of the k-th individual image. A vector Y0 representing the initial pixel value in the cumulative image is a 0 vector, and the cumulative time t0 at this time is 0.

In order to prevent reduction of the proportional contribution per individual image to be caused by the increased number of cumulatively-added individual images, the addition section 72 may perform the addition process as represented by Equation 4.

$$\begin{bmatrix} \vec{Y}_0 \\ t_0 \end{bmatrix} = \begin{bmatrix} \vec{0} \\ 0 \end{bmatrix} \quad (4)$$

$$\begin{bmatrix} \vec{Y}_k \\ t_k \end{bmatrix} = \begin{bmatrix} (1-w) \cdot \vec{Y}_{k-1} + w \cdot \vec{X}_k \\ (1-w) \cdot t_{k-1} + w \cdot e_k \end{bmatrix}$$

In Equation 4, w is a parameter representing the weight for adjusting the proportional contribution of the individual images. The computing process by Equation 4 may be a process using a kind of IIR filter.

That is, with Equation 4, by adding the parameter of weight w and (1-w) to Equation 3, the value of w may determine the minimum proportional contribution of each of the individual images to the cumulative image. The parameter w may be a preset constant, for example.

When the value of w is appropriately set, even with a lapse of sufficiently a long time after the start of imaging, any change of the high-quality image on the display 14 becomes perceivable at all times.

The light source of the movable lighting device 11 is assumed as being white in color. Desirably, the light source emits light of various different colors depending on the characteristics of an object, the purpose of use of images, and the like. In this case, exchanging the light source of the movable lighting device 11 will do, but if image processing realizes the lighting effect of various colors, the user's convenience may be increased to a further degree.

That is, pixel values in an image captured as an individual image are classified into three elements of R, G, and B. These elements are each applied with a matrix filter including positive coefficients of Wr, Wg, and Wb, and the resulting R', G', and B' are used as the pixel values of the individual image. This accordingly implements imaging using lighting in color determined by the coefficients of Wr, Wg, and Wr.

That is, image processing with computing as Equation 5 may be performed by the individual image obtaining section 71, for example.

$$\begin{bmatrix} R' \\ G' \\ B' \end{bmatrix} = \begin{bmatrix} W_r & 0 & 0 \\ 0 & W_g & 0 \\ 0 & 0 & W_b \end{bmatrix} \begin{bmatrix} R \\ G \\ B \end{bmatrix} \quad (5)$$

The lighting effect in various different colors produced by such image processing is implemented by the user operation based on the GUI displayed on the display 14, for example. Alternatively, it may be convenient if a control signal is output to produce the lighting effect in desired color in response to depression of the buttons 23 of the movable lighting device 11, for example.

In the above, Wr, Wg, and Wb are each described as a positive coefficient. Alternatively, these Wr, Wg, and Wb may be negative coefficients, and if this is the case, produced is the lighting effect of darkening too-bright color components.

When light reflects on the surface of the substance being an object, specular reflection may occur, i.e., reflection of light components of the light source irrespective of the surface color of the object. If unwanted specular reflection occurs when the movable lighting device 11 is moved to emit light to the object 12, reducing the light components to be reflected by specular reflection is desirable.

Figure 12:
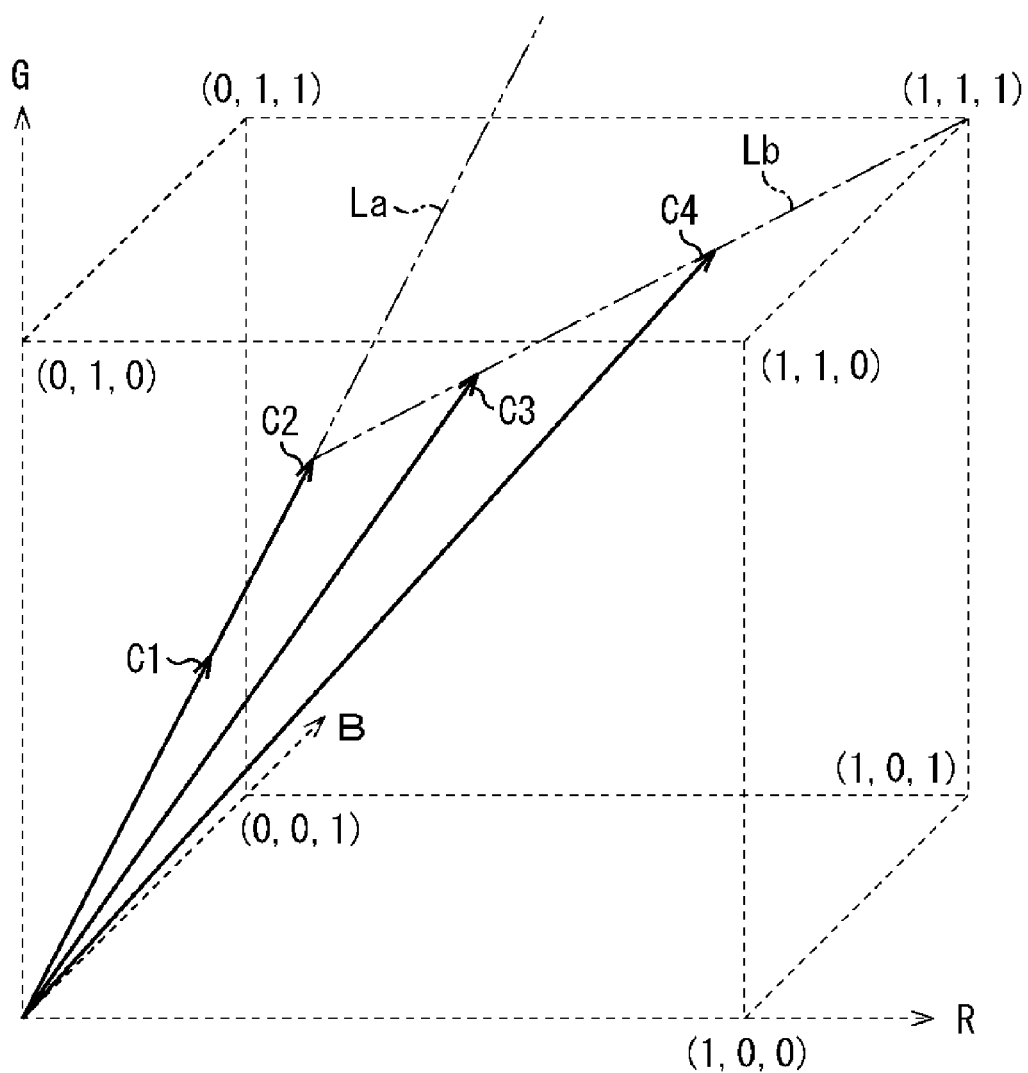
FIG. 12 is a diagram illustrating how a pixel value changes during imaging.

FIG. 12 is a diagram illustrating how a pixel value shows a change during imaging. That is, FIG. 12 illustrates how a color component of a pixel at a predetermined position in a high-quality image (or in a cumulative image) shows a change by repeated cumulative addition in the space in which R, G, and B components are each a straight axis.

As an example, the color represented by a vector C1 at time T=1 is changed to the color represented by a vector C2 at time T=2. In this case, with illumination by light, the color is changed to be brighter along a straight line La that maintains the hue of the surface color of the object 12.

On the other hand, the color represented by a vector C3 at time T=3 is changed to the color represented by a vector C4 at time T=4. That is, from time T3 to T4, the color is changed to be brighter along a straight line Lb, which extends toward (1, 1, 1) representing the white color of the light source of the movable lighting device 11.

The reason of the path change from the straight line La to Lb is the occurrence of specular reflection, i.e., reflection of light components of the light source irrespective of the surface color of the object when light reflects on the surface of the object 12. Herein, the reflected light relevant to the straight line La is diffuse reflection components, and the reflected light relevant to the straight line Lb is specular reflection components.

For reducing such specular reflection components, exemplarily in Equation 4 above, the parameter w may be dynamically changed to reduce the proportional contribution when the specular reflection components are included.

To be specific, in the addition section 72, a pixel value analysis is conducted for an individual image, and as to the color components of pixels in a cumulative image, any change is specified in the space in which R, G, and B components are each a straight axis. In this case, the vector as described above by referring to FIG. 12 is obtained for every pixel, for example.

The direction of the straight line La in FIG. 12 may be determined in advance for every pixel based on an ambient-light image, for example.

As the vectors C1 and C2 in FIG. 12, when a vector representing the pixel color moves along the straight line La that maintains the hue of the surface color of the object 12, for example, the addition section 72 may use the parameter w of a predetermined value for computation with Equation 4. On the other hand, as the vectors C3 and C4 in FIG. 12, when a vector representing the pixel color moves along the straight line Lb that extends toward (1, 1, 1) representing the white color of the light source, the parameter w may be set to a smaller value in Equation 4.

As an example, for each pixel, a difference of direction between the straight line La and each of the color vectors C1 to C4 is computed by inner product calculation or the like using the angle as an evaluation value. The specular reflection components are then defined by strength by calculating the evaluation value of every pixel in a cumulative image, thereby setting the parameter w to be appropriate to the strength of the specular reflection components.

In this manner, specular reflection components observed in a high-quality image may be reduced, for example.

For actual imaging using the multi lighting system, a plurality of lighting devices are disposed around the object, for example. In this case, the lighting devices may vary in lighting intensity to capture images with characteristic shading. According to the embodiment of the present technology, the movable lighting device 11 is solely used, but the shading in the resulting high-quality image may be similar to that in an image captured using the multi lighting system in which lighting devices vary in lighting intensity.

For example, for generating a cumulative image, a weight coefficient appropriate to the state of shading (type of shading) may be used for multiplication at the time of cumulative addition of individual images. This accordingly leads to a high-quality image with shading similar to that in an image captured using a plurality of lighting devices varying in lighting intensity.

As the individual images 101-1 to 101-5 of FIG. 5, the images of the object captured by the camera 13 have different shading depending on the position of the movable lighting device 11. This means a larger number of individual images lead to a larger number of types of shading, thereby resulting in a difficulty in finding a desired type of shading. Therefore, in order to use a weight coefficient appropriate to the type of shading for multiplication at the time of generating a cumulative image, the types of shading are expected to be roughly classified in advance.

Figure 13:
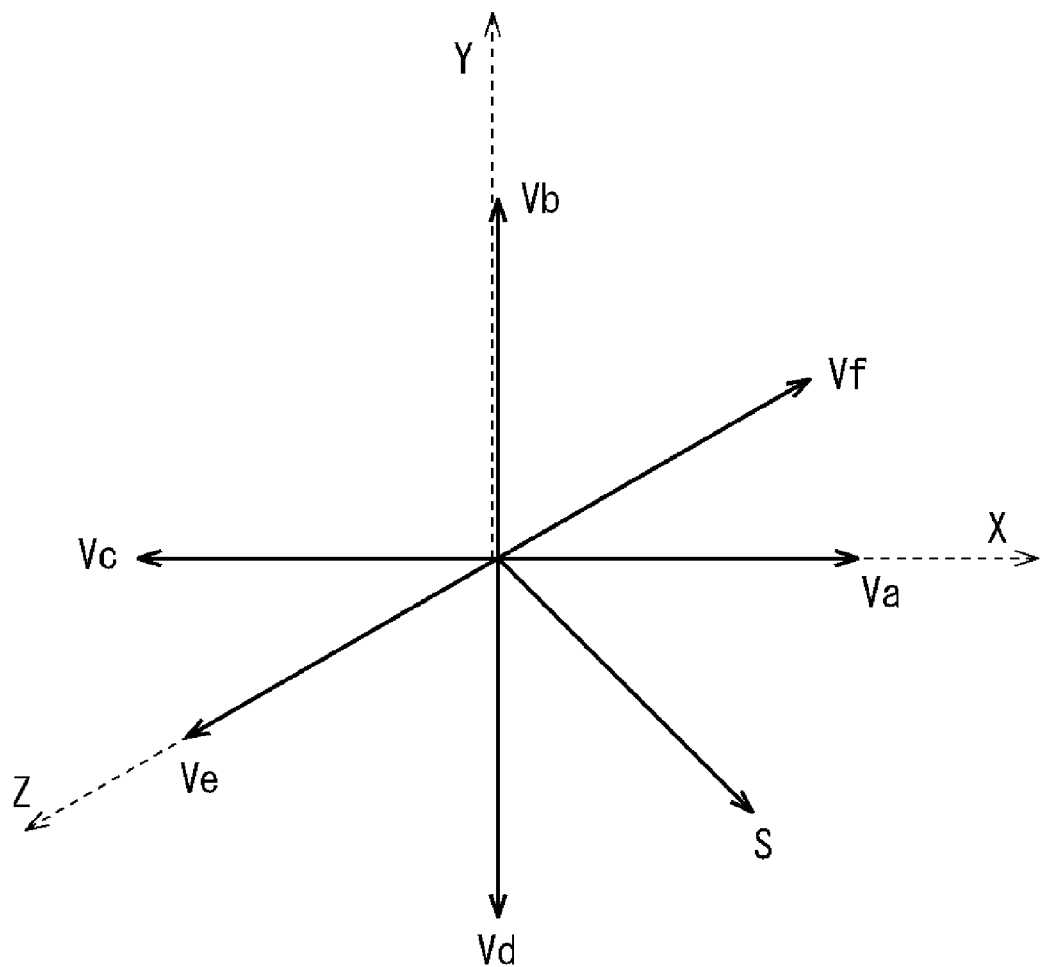
FIG. 13 is a diagram illustrating a mode for rough classification of types of shading.

FIG. 13 is a diagram illustrating a mode for rough classification of types of shading. In this example, the types of shading are classified on the assumption that there is a correlation between the orientation of the light-emitting window 22 of the movable lighting device 11 and the shading of the object 12.

As described above, the movable lighting device 11 is provided with the acceleration sensor 43, and the acceleration sensor 43 detects the acceleration, e.g., detects an acceleration vector in six directions that are positive and negative directions of X-axis, Y-axis, and Z-axis, respectively, in FIGS. 2A and 2B.

FIG. 13 shows unit vectors (vectors Va, Vb, Vc, Vd, Ve, and Vf) of six vectors extending along the X, Y, and Z axes from the origin in the local coordinates of the movable lighting device 11, and a unit vector (vector S) representing the direction of the object 12.

For detecting the unit vector S representing the direction toward the object 12, for example, the acceleration sensor 43 is used to detect the direction of the gravity. The direction of the gravity is then mapped on the local coordinates of the movable lighting device 11, and the direction of gravity is used as the direction toward the object 12.

The manner of detecting the unit vector S representing the direction toward the object 12 is not restrictive to the above, and any other sensors, e.g., gyro sensor and geomagnetic sensor, may be used together. Alternatively, a camera attached to the movable lighting device 11 may be used to specify the position of the object, or a three-dimensional position sensor may be used.

The inner product between the vectors is defined as below.

That is, the inner product Pa is defined as Pa=(Va, S), and the inner product Pb is defined as Pb=(Vb, S). Similarly, the inner products Pc to Pf are respectively defined as Pc=(Vc, S), Pd=(Vd, S), Pe=(Ve, S), and Pf=(Vf, S). Herein, with a comparison of value performed among the inner products Pa to Pf, finding the vector with the maximum inner product leads to identifying the vector closest in direction toward the object among the six vectors extending along the X-axis, Y-axis, and Z-axis. The vector closest in direction toward the object is referred to as vector Vx. That is, the vector Vx is any of the vectors Va, Vb, Vc, Vd, Ve, and Vf.

When the addition section 72 cumulatively adds together the individual images, the image data of the cumulative images may be stored in different memories provided for each of the above six vectors, i.e., vectors Va, Vb, Vc, Vd, Ve, and Vf. Thereafter, any of the memories corresponding to the vector Vx is selected for cumulative addition, and using the cumulative images stored in each of the memories, six high-quality images are generated.

Moreover, the six high-quality images generated as described above may be combined together at an arbitrary ratio, thereby generating a high-quality image with adjusted shading.

Figure 14:
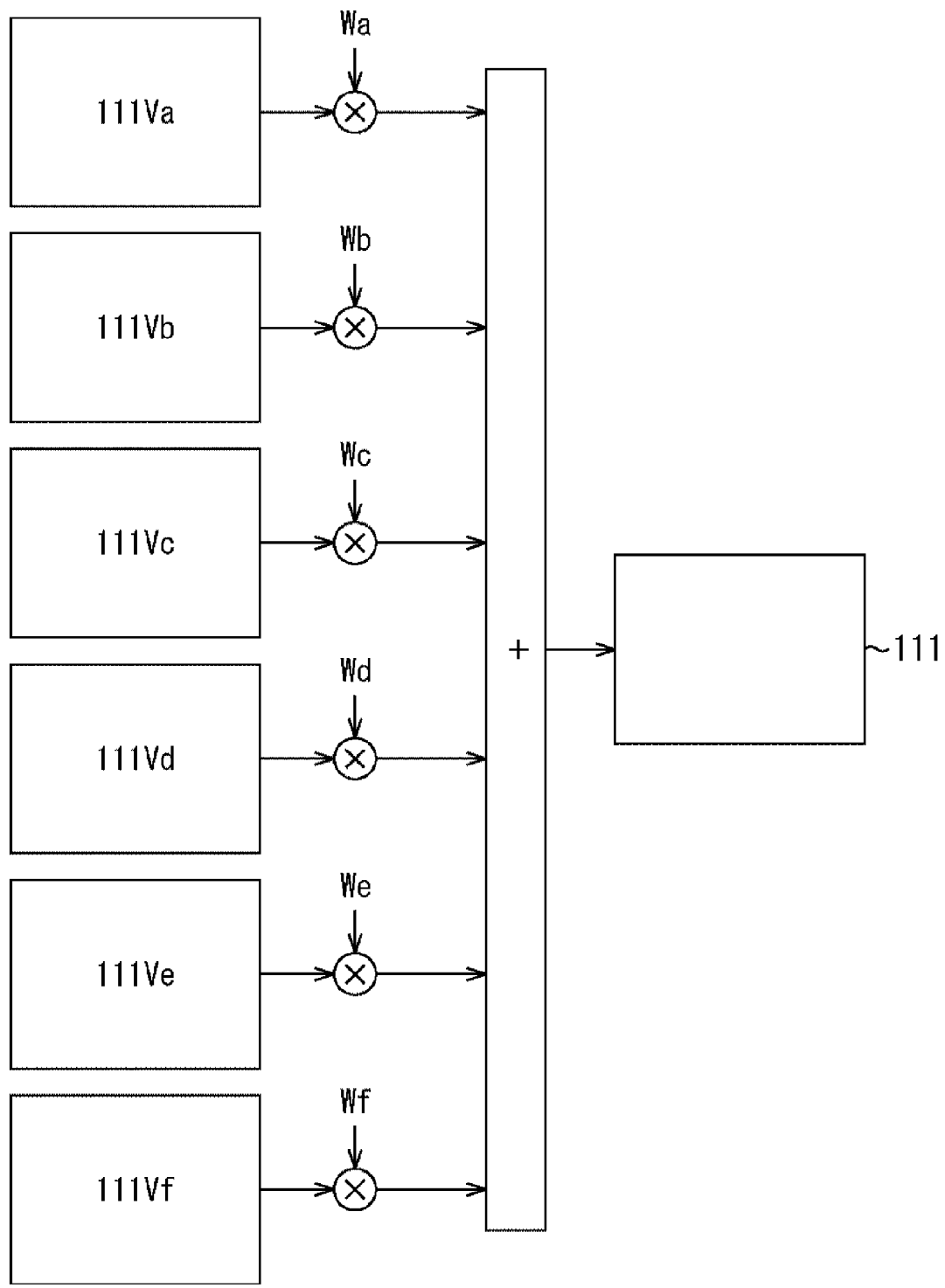
FIG. 14 is a diagram illustrating an example of how a high-quality image is generated with adjusted shading.

FIG. 14 is a diagram illustrating an example of how to generate a high-quality image with adjusted shading as described above. In FIG. 14, images 111Va to 111Vf are six high-quality images generated based on the cumulative images stored in different memories provided for each of the vectors as described above.

As shown in FIG. 14, pixels in the images 111Va to 111Vf are each multiplied by the weight coefficient (Wa, Wb, Wc, Wd, We, or Wf) before cumulative addition so that a high-quality image 111 is obtained with adjusted shading. Herein, the weight coefficients may be so set as to satisfy the condition of Wa+Wb+Wc+Wd+We+Wf=1.

Alternatively, the high-quality image 111 with adjusted shading may be obtained by adjusting the weight coefficients based on the user operation on the images 111Va to 111Vf displayed on the display 14.

Figure 15:
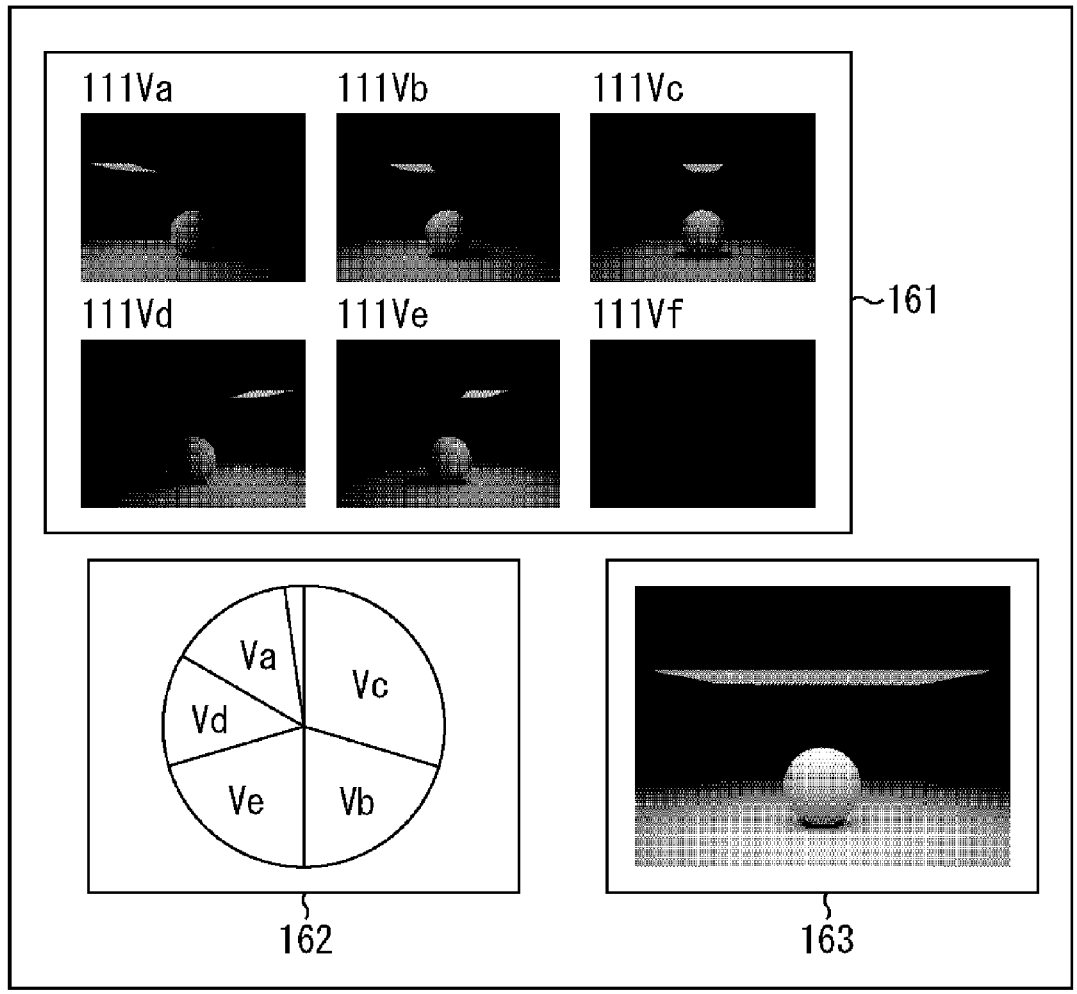
FIG. 15 is a diagram showing an exemplary GUI for adjusting a weight coefficient.

FIG. 15 is a diagram showing an exemplary GUI for use to adjust the weight coefficients Wa to Wf. This GUI is displayed on the display 14 during or after imaging of the object, for example.

In FIG. 15, an area 161 is for display of the six high-quality images generated based on the cumulative images stored in different memories provided for each of the vectors. As shown in the drawing, in the area 161, the images 111Va to 111Vf are displayed.

In FIG. 15, an area 162 is for display of a circle graph indicating the ratio of the respective weight coefficients Wa to Wf. The circle graph in the drawing shows Va, Vb, Vc, and the like, each of which represents the ratio of the weight coefficient Wa, Wb, Wc, or the like. The user is allowed to adjust the ratio of each of the weight coefficients Wa to Wf by a finger touch on the circle graph displayed in the area 162, for example.

In FIG. 15, an area 163 is for display of the high-quality image 111 with adjusted shading. This high-quality image 111 is obtained by cumulative addition of the images 111Va to 111Vf after multiplication of the weight coefficients to the pixels therein. The weight coefficients are those satisfying the condition of Wa+Wb+We+Wd+We+Wf=1, and being set to the ratio in the circle graph in the area 162.

In such a manner, the types of shading are classified based on the orientation of the light-emitting window 22 of the movable lighting device 11, and images appropriate to each type of shading are combined together at the user's preferred ratio so that a high-quality image is obtained. In this manner, the resulting high-quality image may have shading similar to that in an image captured using the multi lighting system in which lighting devices vary in lighting intensity.

Herein, a high-quality image may be obtained with adjusted shading in a different manner from above.

As an example, a plurality of high-quality images may be generated based on the imaging time of individual images, and these high-quality images may be combined at the user's preferred ratio to generate a high-quality image. In this case, the types of shading are classified on the assumption that there is a correlation between the imaging time and the shading of the object 12. That is, on the assumption that the individual images captured in a short time range have almost the same shading, a plurality of high-quality images are generated.

As an example, cumulative images are stored in different memories provided for each predetermined time range, and individual images are cumulatively added together in the time range including the imaging time thereof. For example, provided are memories corresponding to six time ranges, i.e., times T=0 to T=9, times T=10 to T=19, times T=20 to T=29, times T=30 to T=39, times T=40 to T=49, and times T=50 to T=59. Based on the cumulative images stored in these memories, six high-quality images are generated. By combining these high-quality images at a predetermined ratio, a high-quality image is generated with adjusted shading.

Figure 16:
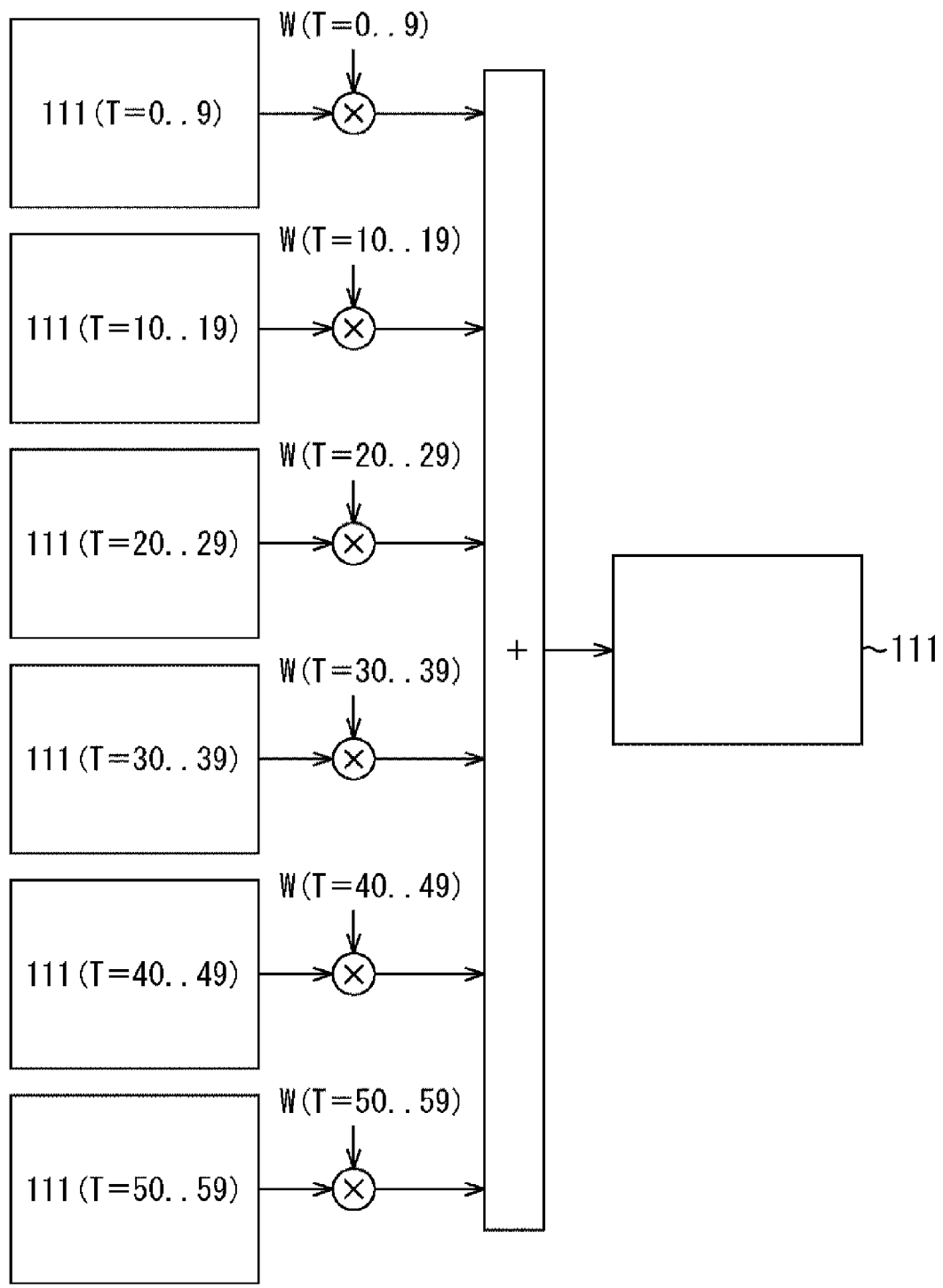
FIG. 16 is a diagram illustrating another example of how a high-quality image is generated with adjusted shading.

FIG. 16 is a diagram illustrating an example of how to generate a high-quality image with adjusted shading as described above. In FIG. 16, images 111 (T=0 . . . 9) to 111 (T=50.59) are six high-quality images described above. The image 111 (T=0 . . . 9) is a high-quality image generated based on cumulative images being the result of cumulative addition of 10 individual images captured in a time range from times T=0 to T=9, and the image 111 (T=10.19) is a high-quality image generated based on cumulative images being the result of cumulative addition of 10 individual images captured in a time range from times T=10 to T=19, for example.

As shown in FIG. 16, by multiplying a weight coefficient to each of the pixels in the images 111 (T=0 . . . 9) to 111 (T=50 . . . 59), the high-quality image 111 with adjusted shading is obtained. The weight coefficients are W(T=0 . . . 9), W(T=10 . . . 19), W(T=20 . . . 29), W(T=30 . . . 39), W(T=40 . . . 49), and W(T=50 . . . 59). These weight coefficients may be so set as to satisfy the condition that the total sum thereof is 1.

Alternatively, the high-quality image 111 may be obtained with adjusted shading by adjusting the weight coefficients by user operation with the images 111 (T=0 . . . 9) to 111 (T=50 . . . 59) displayed on the display 14.

Figure 17:
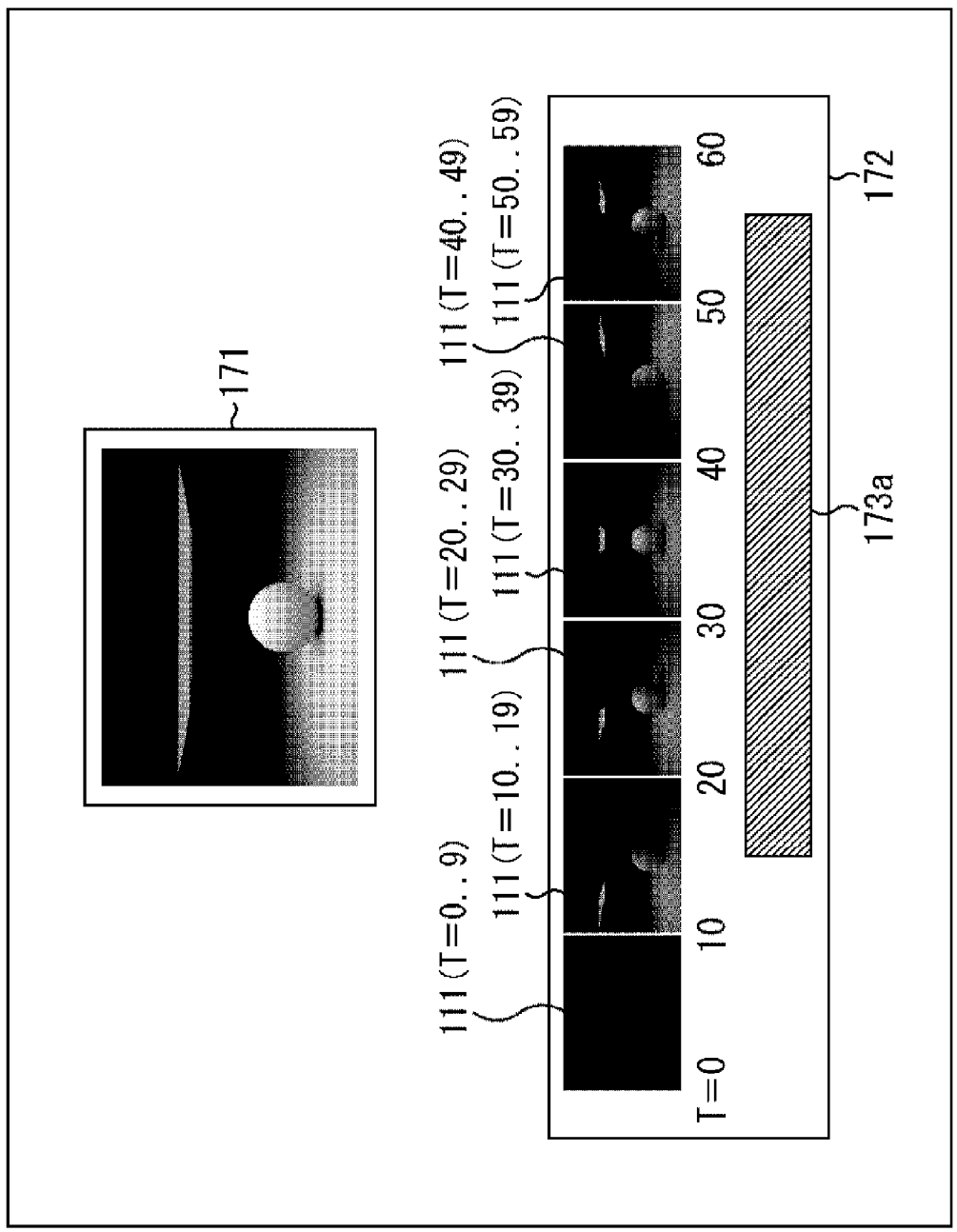
FIG. 17 is a diagram showing another exemplary GUI for adjusting the weight coefficient.

FIG. 17 is a diagram showing an exemplary GUI for use to adjust the weight coefficients of W(T=0 . . . 9) to W(T=50 . . . 59). This GUI is displayed on the display 14 during or after imaging of the object, for example.

In FIG. 17, an area 171 is for display of the high-quality image 111 with adjusted shading. Also in FIG. 17, an area 172 is for display of the images 111(T=0 . . . 9) to 111 (T=50 . . . 59), and below these images 111(T=0 . . . 9) to 111 (T=50 . . . 59), a bar 173a is displayed together with a scale indicating the time T. This bar 173a is used as a basis to specify which images are to be combined at what ratio.

In the example of FIG. 17, the combination ratio of the image 111 (T=0 . . . 9) (or the weight coefficient W (T=0 . . . 9)) is 0%, the combination ratio of each of the images 111 (T=10 . . . 19) and 111 (T=50 . . . 59) is 12.5%, and the combination ratio of each of the images 111 (T=20 . . . 29) to 111 (T=40 . . . 49) is 25%.

Figure 18:
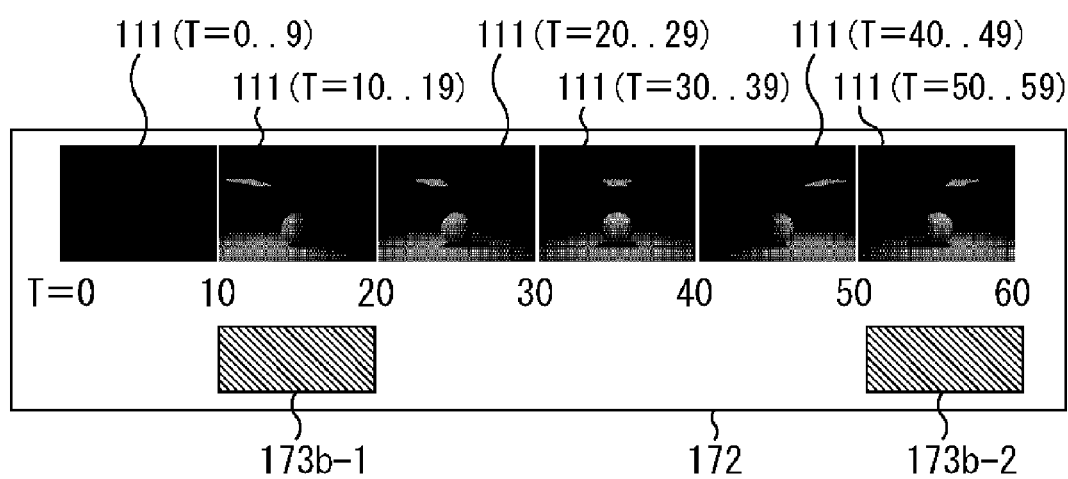
FIG. 18 is a diagram showing still another exemplary GUI for adjusting the weight coefficient.

Alternatively, bars 173b-1 and 173b-2 of FIG. 18 may be used as a basis to specify which images are to be combined at what ratio. In the example of FIG. 18, the combination ratio of each of the images 111 (T=10 . . . 19) and 111 (T=50 . . . 59) is 50%, and the combination ratio of each of the remaining images is 0%.

Herein, the bars 173a and 173b are each an element of the GUI displayed on the display based on the user operation.

In such a manner, by combining high-quality images generated on the time range basis to obtain a high-quality image with adjusted shading, even with any image captured by the user illuminating the object 12 from a wrong direction using the movable lighting device 11, the resulting image may not be affected in terms of shading. That is, even if the user feels "Oops!" in the process of imaging, the effect caused thereby may be removed.

For rough classification of the types of shading, using the directions and times as above is not restrictive, and comparing the degree of similarity of images for classification is also a possibility. For classification by direction, using parameters of six degrees of freedom is more desirable, which represent the direction and position of a rigid body in the space.

In the embodiment described above, image processing may cancel any unexpected appearance of a part of the movable lighting device or the user's hand (a part of the user's body) in the angle of view, for example. To be specific, any portion determined to be a moving object by the general recognition technique of moving objects may be replaced with a portion extracted from an ambient-light image so that an individual image may be corrected for cumulative addition. Alternatively, in a final high-quality image, any portion determined by the recognition technique of moving images to be affected may be replaced with a portion extracted from an ambient-light image.

The series of processes described above may be performed by hardware or software. For the software to perform the series of processes described above, a program in the software is installed over a network or from a recording medium on a computer in a hardware specifically designed therefor, or on such a general-purpose personal computer 700 as shown in FIG. 19 that may perform various functions by installation of various programs, for example.

Figure 19:
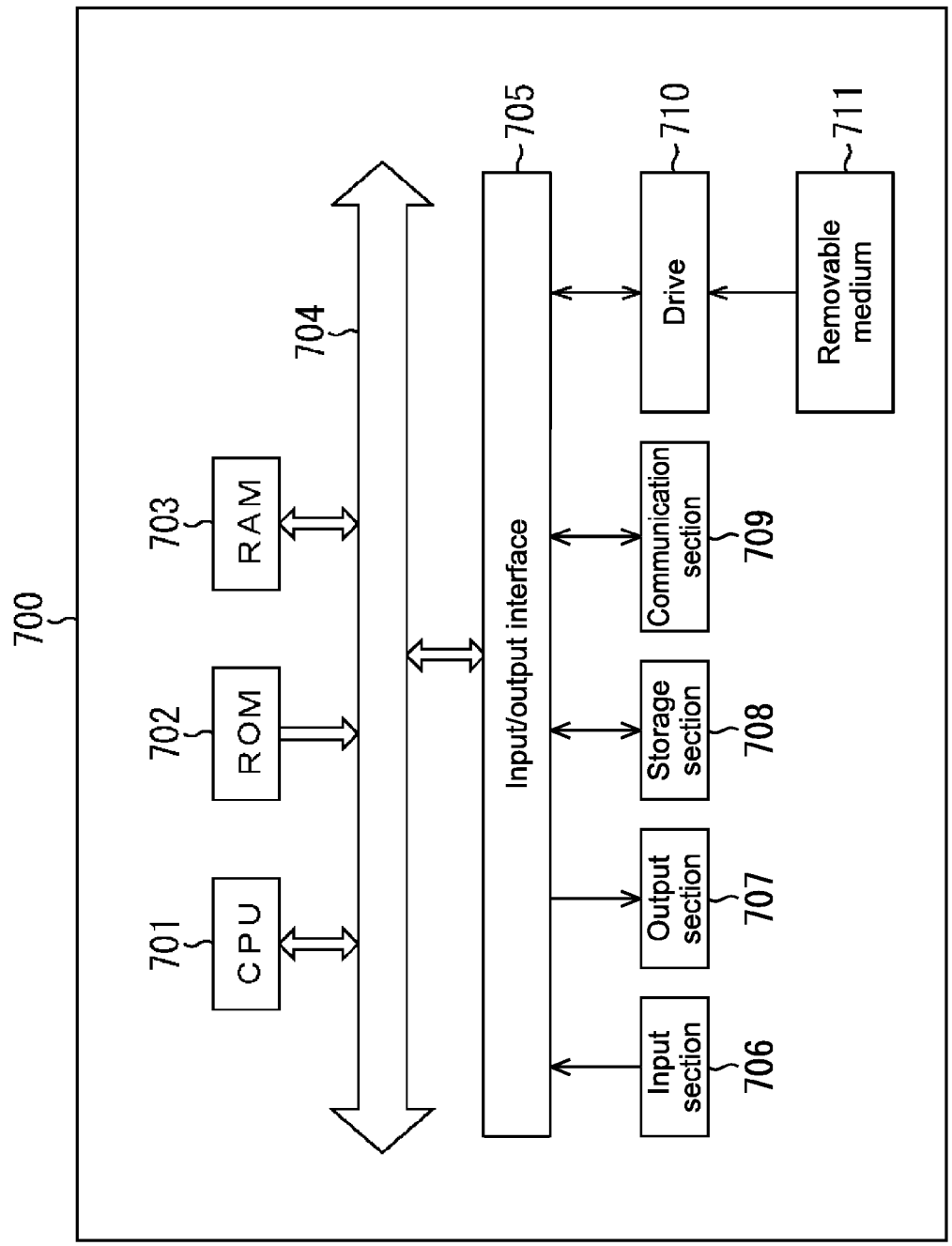
FIG. 19 is a block diagram showing an exemplary configuration of a personal computer.

In FIG. 19, a CPU (Central Processing Unit) 701 performs various types of processes in accordance with a program stored in a ROM (Read Only Memory) 702, or a program loaded from a storage section 708 to a RAM (Random Access Memory) 703. The RAM 703 stores data for the CPU 701 to perform various processes as appropriate.

The CPU 701, the ROM 702, and the RAM 703 are connected to one another via a bus 704. This bus 704 is connected also with an input/output interface 705.

The input/output interface 705 is connected with an input section 706, an output section 707, a storage section 708, and a communication unit 709. The input section 706 includes a keyboard, a mouse, and the like, and the output section 707 includes a display exemplified by LCD (Liquid Crystal Display), a speaker, and the like. The storage section 708 includes a hard disk, for example, and the communication unit 709 includes a modem, a network interface card exemplified by a LAN (Local-Area Network) card, and the like. The communication unit 709 performs a communication process over a network including the Internet.

The input/output interface 705 is connected with a drive 710 as appropriate, and a removable medium 711 including a magnetic disk, an optical disk, a magneto-optical disk, and a semiconductor memory is attached as appropriate. A computer program read from the removable medium 711 is installed on the storage section 708 as appropriate.

When the series of processes described above are performed by software, programs in the software are installed over a network including the Internet, or from a recording medium including the removable medium 711, for example.

Note here that this recording medium is not restrictive to the removable medium 711 of FIG. 19 that is provided separately from the device body, and includes program-recorded disks for program distribution to users, e.g., a magnetic disk (including a floppy disk (trademark)), an optical disk (including a CD-ROM (Compact Disk-Read Only Memory), a DVD (Digital Versatile Disk)), and a magneto-optical disk (including an MD (Mini-Disk)™), and a semiconductor memory. The recording medium may also include the program-recorded ROM 702, a hard disk in the storage section 708, and the like that are incorporated in advance in the device body for distribution to the users.

Note that the series of processes described above surely include processes to be performed in a time series manner in the described order, and include processes not necessarily performed in a time series manner but in a parallel manner or individually.

The foregoing description of the embodiment of the present technology is in all aspects illustrative and not restrictive. It is understood that numerous other modifications and variations may be devised without departing from the scope of the present disclosure.

The present technology may be also in the following structures:

(1) An image processing apparatus, including:

an ambient-light image obtaining section configured to obtain an ambient-light image in a first time range, the ambient-light image being an image of an object captured with a predetermined exposure time;

a cumulative image generation section configured to generate a cumulative image in a second time range after the first time range, the cumulative image being obtained by cumulative addition of each pixel value in a plurality of images, the plurality of images being of the object captured one by one with the predetermined exposure time; and a high-quality image generation section configured to generate a high-quality image, the high-quality image being obtained by subtracting a pixel value in the ambient-light image from a corresponding pixel value in a normalized image, the normalized image being the cumulative image normalized based on a total sum of the exposure time.

(2) The image processing apparatus according to (1), further including a light turning-off detection section configured to determine whether or not a lighting device is turned off, the lighting device being a light source different from a light source from which light is initially emitted for illumination of the object, wherein when the lighting device is determined as being turned off, the ambient-light image is captured.

(3) The image processing apparatus according to (2), in which the lighting device is turned on during imaging in a time range after the ambient-light image is captured.

(4) The image processing apparatus according to (3), in which the lighting device is held by a user, and is moved in an arc.

(5) The image processing apparatus according to (3), in which the cumulative image generation section is configured to perform the cumulative addition of the images of the object captured in the second time range, the cumulative addition being performed by classifying the images by direction based on information specifying toward which directions the lighting device emits light, and the high-quality image generation section is configured to generate another high-quality image by combining the high-quality images at a predetermined ratio, the high-quality images each being obtained by subtracting the pixel value in the ambient-light image from the corresponding pixel value in the normalized image, the normalized image being each of the cumulative images classified by direction and normalized based on the total sum of the exposure time.

(6) The image processing apparatus according to (5), further including a display section configured to produce an image display, wherein the display section is configured to display a GUI that is for specifying the ratio of combining the plurality of high-quality images.

(7) The image processing apparatus according to any one of (1) to (6), in which the cumulative image generation section is configured to divide the second time range into a plurality of short time ranges, and perform the cumulative addition of the images of the object captured in the second time range by classifying the images by the short time range, and the high-quality image generation section is configured to generate another high-quality image by combining the high-quality images at a predetermined ratio, the high-quality images each being obtained by subtracting the pixel value in the ambient-light image from the corresponding pixel value in the normalized image, the normalized image being each of the cumulative images classified by the short time range and normalized based on the total sum of the exposure time.

(8) The image processing apparatus according to (7), further including a display section configured to produce an image display, wherein the display section is configured to display a GUI that is for specifying the ratio of combining the plurality of high-quality images.

(9) The image processing apparatus according to any one of (1) to (8), further including a display section configured to produce an image display, wherein in the second time range, the high-quality image is sequentially displayed on the display section.

(10) The image processing apparatus according to (9), in which a gain shows a gradual increase before a lapse of a predetermined time in the second time range, the gain being multiplied to a luminance value of a pixel in the high-quality image displayed on the display section.

(11) The image processing apparatus according to (9), in which a gain shows a gradual increase before a maximum luminance value of a pixel in the cumulative image reaches a predetermined value, the gain being multiplied to a luminance value of a pixel in the high-quality image displayed on the display section.

(12) The image processing apparatus according to any one of (1) to (11), in which in the cumulative image, a weight coefficient is multiplied to each of the pixel values in the plurality of images to prevent a per-image proportional contribution of the images from being lower than a predetermined value, the images being captured in the second time range.

(13) The image processing apparatus according to (12), in which occurrence of specular reflection on a surface of the object is detected based on a change of a pixel value in the cumulative image, and the weight coefficient is changed in value to reduce the proportional contribution of the image observed with the specular reflection.

(14) The image processing apparatus according to any one of (1) to (13), in which by a predetermined computing process performed on the pixel values, a lighting color is changed to illuminate the object in the images captured in the second time range.

(15) An image processing method, including:

obtaining, by an ambient-light image obtaining section, an ambient-light image in a first time range, the ambient-light image being an image of an object captured with a predetermined exposure time;

generating, by a cumulative image generation section, a cumulative image in a second time range after the first time range, the cumulative image being obtained by cumulative addition of each pixel value in a plurality of images, the plurality of images being of the object captured one by one with the predetermined exposure time; and generating, by a high-quality image generation section, a high-quality image, the high-quality image being obtained by subtracting a pixel value in the ambient-light image from a corresponding pixel value in a normalized image, the normalized image being the cumulative image normalized based on a total sum of the exposure time.

(16) A program causing a computer to function as an image processing apparatus, the apparatus including:

an ambient-light image obtaining section configured to obtain an ambient-light image in a first time range, the ambient-light image being an image of an object captured with a predetermined exposure time;

a cumulative image generation section configured to generate a cumulative image in a second time range after the first time range, the cumulative image being obtained by cumulative addition of each pixel value in a plurality of images, the plurality of images being of the object captured one by one with the predetermined exposure time; and a high-quality image generation section configured to generate a high-quality image, the high-quality image being obtained by subtracting a pixel value in the ambient-light image from a corresponding pixel value in a normalized image, the normalized image being the cumulative image normalized based on a total sum of the exposure time.

What is claimed is:

1. An image processing apparatus, comprising:
   an ambient-light image obtaining section configured to obtain an ambient-light image in a first time range, the ambient-light image being an image of an object captured with a predetermined exposure time;
   a cumulative image generation section configured to generate a cumulative image in a second time range after the first time range, the cumulative image being obtained by cumulative addition of each pixel value in a plurality of images, the plurality of images being of the object captured one by one with the predetermined exposure time; and
   a high-quality image generation section configured to generate a high-quality image, the high-quality image being obtained by subtracting a pixel value in the ambient-light image from a corresponding pixel value in a normalized image, the normalized image being the cumulative image normalized based on a total sum of the exposure time.

2. The image processing apparatus according to claim 1, further comprising a light turning-off detection section configured to determine whether or not a lighting device is turned off, the lighting device being a light source different from a light source from which light is initially emitted for illumination of the object, wherein when the lighting device is determined as being turned off, the ambient-light image is captured.

3. The image processing apparatus according to claim 2, wherein the lighting device is turned on during imaging in a time range after the ambient-light image is captured.

4. The image processing apparatus according to claim 3, wherein the lighting device is held by a user, and is moved in an arc.

5. The image processing apparatus according to claim 3, wherein the cumulative image generation section is configured to perform the cumulative addition of the plurality of images of the object captured in the second time range, the cumulative addition being performed by classifying the plurality of images by direction based on information specifying toward which directions a lighting device emits light, and the high-quality image generation section is configured to generate another high-quality image by combining the high-quality images at a predetermined ratio, the high-quality images each being obtained by subtracting the pixel value in the ambient-light image from the corresponding pixel value in another normalized image, the other normalized image being each of the cumulative images classified by direction and normalized based on the total sum of the exposure time.

6. The image processing apparatus according to claim 5, further comprising a display section configured to produce an image display, wherein the display section is configured to display a GUI that is for specifying the ratio of combining the plurality of high-quality images.

7. The image processing apparatus according to claim 1, wherein the cumulative image generation section is configured to divide the second time range into a plurality of short time ranges, and perform the cumulative addition of the plurality of images of the object captured in the second time range by classifying the plurality of images by the short time range, and the high-quality image generation section is configured to generate another high-quality image by combining the high-quality images at a predetermined ratio, the high-quality images each being obtained by subtracting the pixel value in the ambient-light image from the corresponding pixel value in another normalized image, the other normalized image being each of the cumulative images classified by the short time range and normalized based on the total sum of the exposure time.

8. The image processing apparatus according to claim 7, further comprising a display section configured to produce an image display, wherein the display section is configured to display a GUI that is for specifying the ratio of combining the plurality of high-quality images.

9. The image processing apparatus according to claim 1, further comprising a display section configured to produce an image display, wherein in the second time range, the high-quality image is sequentially displayed on the display section.

10. The image processing apparatus according to claim 9, wherein a gain shows a gradual increase before a lapse of a predetermined time in the second time range, the gain being multiplied to a luminance value of a pixel in the high-quality image displayed on the display section.

11. The image processing apparatus according to claim 9, wherein a gain shows a gradual increase before a maximum luminance value of a pixel in the cumulative image reaches a predetermined value, the gain being multiplied to a luminance value of a pixel in the high-quality image displayed on the display section.

12. The image processing apparatus according to claim 1, wherein in the cumulative image, a weight coefficient is multiplied to each of the pixel values in the plurality of images to prevent a per-image proportional contribution of the images from being lower than a predetermined value, the images being captured in the second time range.

13. The image processing apparatus according to claim 12, wherein occurrence of specular reflection on a surface of the object is detected based on a change of a pixel value in the cumulative image, and the weight coefficient is changed in value to reduce the proportional contribution of the image observed with the specular reflection.

14. The image processing apparatus according to claim 1, wherein by a predetermined computing process performed on the pixel values, a lighting color is changed to illuminate the object in the images captured in the second time range.

15. An image processing method, comprising:
   obtaining, by an ambient-light image obtaining section, an ambient-light image in a first time range, the ambient-light image being an image of an object captured with a predetermined exposure time;
   generating, by a cumulative image generation section, a cumulative image in a second time range after the first time range, the cumulative image being obtained by cumulative addition of each pixel value in a plurality of images, the plurality of images being of the object captured one by one with the predetermined exposure time; and
   generating, by a high-quality image generation section, a high-quality image, the high-quality image being obtained by subtracting a pixel value in the ambient-light image from a corresponding pixel value in a normalized image, the normalized image being the cumulative image normalized based on a total sum of the exposure time.

16. A non-transitory computer readable medium having stored thereon, a set of computer-executable instructions causing a computer to perform steps comprising:

obtaining an ambient-light image in a first time range, the ambient-light image being an image of an object captured with a predetermined exposure time;

generating a cumulative image in a second time range after the first time range, the cumulative image being obtained by cumulative addition of each pixel value in a plurality of images, the plurality of images being of the object captured one by one with the predetermined exposure time; and generating a high-quality image, the high-quality image being obtained by subtracting a pixel value in the ambient-light image from a corresponding pixel value in a normalized image, the normalized image being the cumulative image normalized based on a total sum of the exposure time.

* * * * *